United States Patent
Tanimura et al.

(10) Patent No.: US 6,537,508 B1
(45) Date of Patent: *Mar. 25, 2003

(54) ELECTRIC ENERGY CONVERTING/STORING SYSTEM

(75) Inventors: Yasuhiro Tanimura, Tokyo (JP); Masaki Kuzumoto, Tokyo (JP); Junji Hirotsuji, Tokyo (JP); Shigeki Nakayama, Tokyo (JP); Osamu Matsuoka, Tokyo (JP); Masao Nozaki, Chiba (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 49 days.

This patent is subject to a terminal disclaimer.

(21) Appl. No.: 09/717,288

(22) Filed: Nov. 22, 2000

Related U.S. Application Data

(62) Division of application No. 08/808,639, filed on Feb. 28, 1997.

(30) Foreign Application Priority Data

Mar. 1, 1996 (JP) ................................. 8-44792

(51) Int. Cl.$^7$ ............................. B01J 19/08; B01J 19/12
(52) U.S. Cl. ............................. 422/186.07; 422/186.14; 422/186.2
(58) Field of Search ...................... 422/186.07, 186.11, 422/186.14, 186.2

(56) References Cited

U.S. PATENT DOCUMENTS 3,284,367 A   11/1966   Mahieux
3,963,625 A   6/1976    Lowther (List continued on next page.)

FOREIGN PATENT DOCUMENTS

JP   358204803 A   11/1983
JP   52-3595       12/1997

OTHER PUBLICATIONS

Derwent Publications, Week 9507, JP 06 330 364, Nov. 1994.
Derwent Publications, Week 8150, JP 56 140 002, Nov. 1981.
Perry, Robert H. Chemical Engineer's Handbook, McGraw–Hill, Fifth Edition, 1973 no month available.
JPO Abstract of JP358204803A, Nov. 1983.
JPO Abstract of JP357188406A, Nov. 1982.

*Primary Examiner*—Nam Nguyen
*Assistant Examiner*—Wesley A. Nicolas
(74) *Attorney, Agent, or Firm*—Sughrue Mion, PLLC

(57) ABSTRACT

An electric energy conversion/storage system includes an ozone generating means (12) for producing an ozonized gas from a raw material gas containing oxygen by utilizing electric energy, an ozone adsorbing/desorbing means (15) for adsorbing ozone contained in the ozonized gas and desorbing ozone from the adsorbed state, a gas circulation system for causing the raw material gas and the ozonized gas to flow through the ozone generating means (12) and the ozone adsorbing/desorbing means (15) while feeding back to the ozone generating means (12) a residual part of the oxygen gas remaining after adsorption of ozone, a coolant supply means (16) for cooling the ozone adsorbing/desorbing means (15), and an ozone discharging means (29, 30) for taking out an ozone containing gas which contains ozone molecules from the ozone adsorbing/desorbing means (15) to thereby supply the ozone containing gas to an ozone consumer (23). The ozone discharging means (29, 30) includes an ozone concentration control means (29) for enabling supply of the ozone containing gas to the ozone consumer (23) substantially at a predetermined ozone concentration and substantially at a predetermined constant flow rate.

13 Claims, 20 Drawing Sheets

U.S. PATENT DOCUMENTS

| | | |
|---|---|---|
| 4,430,306 A | 2/1984 | Namba et al. |
| 4,453,953 A | 6/1984 | Tanaka et al. |
| 4,462,965 A | 7/1984 | Azuma et al. |
| 4,552,659 A | 11/1985 | Tabata et al. |
| 5,364,505 A | 11/1994 | Funk et al. |
| 5,520,887 A | 5/1996 | Shimizu et al. |
| 5,705,468 A | 1/1998 | Yant et al. |
| 5,888,271 A | 3/1999 | Tanimura et al. |
| 6,054,102 A * | 4/2000 | Tanimura et al. ...... 422/186.07 |

* cited by examiner

FIG. 6

| SOLVENTS | WATER | ACETIC ACID | SOLUTION OF SALT | FREON 22 |
|---|---|---|---|---|
| AMOUNT OF OZONE SOLVED PER LITRE OF SOLVENT (g/lit.) | 0.9 | 3.6 | 0.4 | 1050 |

ELECTRIC ENERGY CONVERTING/STORING SYSTEM

This is a division of application Ser. No. 08/808,639, filed Feb. 28, 1997, and currently pending, the disclosure of which is incorporated herein by reference.

BACKGROUND OF THE INVENTION

1. Field of the Invention

The present invention relates to an electric power or electric energy conversion/storage system and an electric energy converting/storing method for generating or producing an ozone gas-by using electric energy and storing the ozone gas for supplying it to an ozone utilization object (hereinafter referred to as ozone consumer) continuously at a given flow rate, as occasions demand.

2. Description of Related Art

For having better understanding of the invention, technical background thereof will first be described. Heretofore, as the electric energy storage apparatuses for storing electric energy generated during the night, there are well known in the art the apparatuses designed for converting the electric energy into heat for storing the former in the form of thermal energy, as exemplified by an electric water heater, a heat-accumulation type hot-air generator, a cold-accumulation type cooler and the like. FIG. 18 is a side elevational view showing in section a structure of a conventional electric energy conversion/storage system such as an electric water heater. Referring to the figure, the electric energy conversion/storage system includes a hot-water inlet port 1 mounted at the top end, and a heat insulator 2 serving for preventing hot water as poured through the hot-water inlet port 1 from getting cool.

Formed integrally in the heat insulator 2 is a hot water reserving tank 3 in which an electric heater 4 is disposed for heating water stored in the hot water reserving tank 3 as occasion demands. The temperature of hot water contained within the hot water reserving tank 3 is detected by a temperature sensor 5, wherein the temperature detection signal outputted from the temperature sensor 5 is supplied to an automatic temperature regulating unit 6 which serves to control or adjust the temperature of hot water within the hot water reserving tank 3. Hot water stored within the hot water reserving tank 3 can be taken out through a water outlet port 7 mounted at a location close to the bottom of the electric water heater.

Operation of the conventional electric energy conversion/storage system (electric water heater) shown in FIG. 18 will be briefly reviewed below.

When water is fed to within the hot water reserving tank 3 through the water inlet port 7, water is heated up to a predetermined temperature and taken out as hot water through the hot-water outlet port 7, as it is demanded. The temperature of hot water contained within the hot water reserving tank 3 is detected by the temperature sensor 5 disposed within the hot water reserving tank 3. The electric power supply to the temperature sensor 5 is controlled by means of the automatic temperature regulating unit 6 so that the temperature of the hot water contained within the hot water reserving tank 3 is maintained at a value preset at the automatic temperature regulating unit 6. In this manner, in the electric water heater now under consideration, electric energy is transformed into heat or thermal energy and stored in water which may thus be referred to as a heat storing or accumulating medium.

Further, FIG. 19 is a side elevational view showing in section a heat-accumulation type hot-air generator as another one of the conventional electric energy conversion/storage systems known heretofore. In the figure, reference numeral 4 and 6 designates an electric heater and an automatic temperature regulating unit described above in conjunction with FIG. 18. The heat-accumulation type hot-air (or gas) generator includes a thermal insulation layer 8 for suppressing heat as stored from dissipating to the ambient, and a heat accumulating medium 9 charged within a chamber enclosed by the thermal insulation layer 8. An air flow passage 10 extends through the heat accumulating medium 9 for allowing air flowing through the passage 10 to take out heat from the heat accumulating medium 9. Further provided is a blower 11 which serves for feeding air into the passage 10. In the heat-accumulation type hot-air generator described above, there is usually employed as the heat accumulating medium 9 a heat resistant brick or the like material.

Operation of the heat-accumulation type hot-air generator shown in FIG. 19 will be described below. The heat accumulating medium 9 charged within the chamber defined by the thermal insulation layer 8 is heated by the electric heater 4 up to a value preset at the automatic temperature regulating unit 6. Thus, electric energy is converted or transformed into heat or thermal energy to be stored in the heat accumulating medium 9. Heat accumulated in this manner can be extracted by air which is forced to flow through the passage 10 by means of the blower 11 with heat transfer taking place between the heat accumulating medium 9 and the air flow known heretofore.

Further, FIG. 20 is a schematic diagram showing a general arrangement of a conventional intermittent-operation type ozone supply system which represents another example of the electric energy conversion/storage system.

Referring to FIG. 20, a raw material gas (hereinafter referred to as the raw gas) containing oxygen (i.e., oxygen containing gas) fed from an oxygen supplying source 13 undergoes ozonization under the action of electric discharge (not shown) within an ozone generator (which is also referred to as the ozonizer) 12. To this end, a circulating blower 14 is provided for circulating the oxygen containing gas supplied from the oxygen supplying source 13 to a gas circulation system including the ozone generator 12.

Further provided is an ozone adsorption/desorption tower 15 serving as an ozone adsorption/desorption means for adsorbing ozone molecules from the ozonized gas (ozone containing oxygen gas) and desorbing ozone from the adsorbed state. The ozone adsorption/desorption tower 15 is charged with an adsorbent (described later on) for storing temporarily ozone molecules contained in the gas fed from the ozone generator 12. Further provided in the ozone supply system are a coolant supply source 16 for supplying a coolant for cooling the ozone adsorption/desorption tower 15, a heating medium source 17 for supplying a medium for heating the ozone adsorption/desorption tower 15 and a water ejector 18 for extracting or desorbing ozone molecules under depressurization from the ozone adsorption/desorption tower 15.

The adsorption/desorption tower 15 is implemented in a double-drum or double-cylinder structure, wherein the inner drum or cylinder 15a is filled with an adsorbent while the outer drum or cylinder 15b is filled with a heat transfer medium. Parenthetically, silica gel is commonly used as the adsorbent with ethylene glycol or alcohols being used as the heat transfer medium, wherein the inner cylinder 15a is fluidally communicated with the ozone generator 12, the circulating blower 14 and the water ejector 18, while the outer cylinder 15b is communicated with the coolant supply source 16 and the heating medium source 17.

Further, a variety of change-over valves 19a to 19g are interposed between exit ports and inlet ports of the ozone adsorption/desorption tower 15. More specifically, the change-over valves 19a and 19b are installed at locations upstream and downstream, respectively, of the coolant supply source 16, the change-over valves 19-c and 19d are installed between the ozone adsorption/desorption tower 15 and the circulating blower 14 and between the ozone adsorption/desorption tower 15 and the ozone generator 12, respectively, the change-over valve 19-e is installed at a connecting point or a junction between the ozone adsorption/desorption tower 15 and the water ejector 18, and the change-over valves 19-f and 19g are installed at locations upstream and downstream, respectively, of the heating medium source 17.

Next, description will turn to operation of the conventional intermittent-operation type ozone supply system shown in FIG. 20.

At first, in an ozone adsorption operation mode, an oxygen gas is supplied from the oxygen supplying source 13, whereby the gas circulation system including the ozone generator 12 and the circulating blower 14 is maintained constantly at a predetermined pressure. In practical applications, this pressure is usually set at 1.5 kg/cm$^2$.

When the oxygen gas is forced to flow through the gas circulation system by driving the circulating blower 14 with the change-over valves 19c and 19d being opened, a part of the oxygen gas is transformed into ozone (i.e., ozonized) under the effect of silent electric discharge when the oxygen gas flows through an electric discharge gap defined between electrodes (not shown) disposed within the ozone generator 12, whereby an ozonized oxygen gas (i.e., ozone containing oxygen gas) is produced to be subsequently transported to the adsorption/desorption tower 15. The amount of oxygen consumed in producing ozone during this process is supplemented from the oxygen supplying source 13.

The adsorbent charged in the ozone adsorption/desorption tower 15 adsorbs selectively ozone molecules from the ozonized oxygen gas, wherein a residual part of the oxygen gas is fed back toward the circulating blower 14 through the change-over valve 19c. In this connection, the ozone adsorbent has such a property that the ozone adsorption capacity increases as the temperature thereof becomes lower. In consideration of this fact, the cooling temperature of the ozone adsorption/desorption tower 15 is usually maintained at a level not higher than −30° C. by means of the coolant supply source 16.

When the ozone adsorbent reaches a saturated adsorption level, operation of the ozone storage/supply system is changed over to an ozone desorbing operation mode. In this case, operations of the ozone generator 12, the circulating blower 14 and the coolant supply source 16 are stopped with the change-over valves 19a, 19b, 19c and 19d being closed.

Subsequently, the heating medium source 17 and the water ejector 18 are put into operation with the change-over valves 19e, 19f and 19g being opened. In this case, the heating medium source 17 serves to increase the temperature of the adsorbent by applying heat for the purpose of facilitating or promoting the desorption of ozone molecules from the adsorbent.

Ozone molecules desorbed from the adsorbent filled in the ozone adsorption/desorption tower 15 are drawn or drained into the water ejector 18 under the effect of depressurization prevailing at the exit side of the ozone adsorption/desorption tower 15 to be thereby dispersed and solved in water. Ozone containing water thus produced is then carried to a utilization facility, i.e., ozone consumer.

The conventional electric energy storage methods and apparatuses suffer various shortages. In the case of the heat storage apparatus shown in FIGS. 18 and 19, the amount of heat which can be stored per unit volume of the heat storing medium is determined previously. Accordingly, an attempt for increasing the amount of electric energy which can be stored or accumulated will naturally be accompanied with a correspondingly increased volume of the heat storing/accumulating medium. Thus, the conventional apparatus can not satisfactorily meet the demand, i.e., lacks in adaptability required in practical applications.

Besides, the heat storing capability of the apparatuses as well as demand for the thermal energy is not constant throughout the year but undergoes variations in dependence on environmental temperature and the seasons, giving rise to a problem that the electric energy can not be stored for subsequent utilization with high efficiency.

On the other hand, in the case of the intermittent-operation type ozone supply apparatus shown in FIG. 20, there is a problem that the ozone gas can not be supplied to the ozone consumer steadily at a predetermined flow rate. Besides, because water is used for taking out ozone molecules, utilization of ozone is limited to water treatment applications. Additionally, since ozone is easy to decompose within water (decomposition occurs within a few minutes), limitation is imposed on the time or period for utilizing ozone.

SUMMARY OF THE INVENTION

In the light of the state of the art described above, it is an object of the present invention to provide an electric power converting/storing method which is capable of storing ozone generated by using electric energy with high efficiency.

Another object of the present invention is to provide an electric energy conversion/storage system which is capable of storing ozone produced by using electric energy and which allows ozone as stored to be supplied steadily at a predetermined flow rate to an ozone consumer as occasion demands it.

In view of the above and other objects which will become apparent as the description proceeds, there is provided according to an aspect of the present invention an electric energy converting/storing method which includes the steps of producing an ozonized gas by using electric energy during a time period in which electric power consumption is low, storing ozone contained in the ozonized gas, and taking out the stored ozone as an ozone containing gas for utilization thereof during a time period in which the electric power consumption is high.

With the method described above, demand for the electric energy can be uniformized throughout the day and the night owing to the effective utilization of the electric energy during the night in which the demand for the electric energy is low.

In a preferred mode for carrying out the method mentioned just above, the ozonized gas may be compressed for storage in the zone storing step.

With the method mentioned just above, electric energy can be stored with an enhanced efficiency because the ozone gas produced by utilizing electric energy is stored in the compressed state. Besides, utilization of electric energy can be uniformized. Additionally, ozone storage and discharge operation can be much facilitated by storing the ozone gas in the compressed state.

In another preferred mode for carrying out the method mentioned above, ozone concentration of the ozonized gas upon storage thereof in the compressed state may be set in a range of 10±3% by weight.

With the method mentioned above, the ozone gas can be stored with electric energy utilization efficiency while protecting ozone molecules from being decomposed upon storage thereof.

In yet another preferred mode for carrying out the method mentioned previously, ozone contained in the ozonized gas may be absorbed by a solvent for storage thereof.

Owing to the use of a solvent as mentioned above, storage of ozone gas as well as delivery thereof can be much facilitated.

In still another preferred mode for carrying out the method described just above, the solvent should preferably be an organic solvent.

In this case, the amount of ozone molecules as adsorbed per unit volume of adsorbent can be significantly increased, which of source contributes to more effective utilization of electric energy.

In a further preferred mode for carrying out the method mentioned previously, ozone contained in the ozonized gas may be adsorbed by an adsorbent for storage thereof.

Owing to the use of adsorbent for the storage of ozone gas, not only the ozone storage but also delivery of the ozone gas can be much facilitated, which of course contributes to uniformization of the electric energy demand.

In a yet further preferred mode for carrying out the method mentioned just above, the adsorbent may be comprised of at least one selected from a group consisting of a porous material impregnated with fluorocarbon, silica gel, activated alumina and combinations thereof.

With the adsorbent formed of the material mentioned above, decomposition of ozone molecules upon storage of the ozone gas can be suppressed to a minimum, ensuring effective utilization of electric energy.

According to another general aspect of the present invention, there is provided an electric energy conversion/storage system which includes an ozone generating means for producing an ozonized gas from a raw material gas containing oxygen by utilizing electric energy, an ozone adsorbing/desorbing means for adsorbing ozone contained in the ozonized gas and desorbing ozone adsorbed, a gas circulation system for causing the raw material gas and the ozonized gas to flow by way of the ozone generating means and the ozone absorbing/desorbing means while feeding back to the ozone generating means a residual-oxygen gas remaining after adsorption of ozone from the ozonized gas, a coolant supply means for cooling the ozone adsorbing/desorbing means, and an ozone discharging means for taking out an ozone containing gas which contains ozone from the ozone adsorbing/desorbing means to thereby supply the ozone containing gas to an ozone consumer. The ozone discharging means includes an ozone concentration control means for enabling supply of the ozone containing gas to the ozone consumer substantially at a predetermined ozone concentration and substantially at a predetermined constant flow rate.

With the arrangement of the electric energy conversion/storage system described above, the ozone molecules can be stored efficiently while ozone gas can steadily be supplied to the ozone consumer at a predetermined ozone concentration and at a predetermined flow rate. Besides, storage and delivery of the ozone gas can be facilitated.

In a preferred mode for carrying out the invention, the electric energy conversion/storage system described just above may further include a pressure sustaining means for sustaining a pressure within the ozone adsorbing/desorbing means to be higher than the atmospheric pressure.

With the arrangement mentioned above, ozone adsorption capability of the adsorbent can be improved, whereby ozone storage efficiency as well as electric energy utilization efficiency of the electric energy conversion/storage system can be significantly enhanced.

In another preferred mode for carrying out the invention, the pressure sustaining means mentioned above may include a pressurizing pump means disposed at an entrance side of the ozone absorbing/desorbing means, a flow regulating means for adjusting a flow rate of the ozonized gas supplied to the pressurizing pump means to be substantially constant, and a back-pressure valve means disposed at an exit side of the ozone adsorbing/desorbing means for restoring pressure of the raw material gas supplied to the ozone generating means to the atmospheric pressure.

By virtue of the arrangement mentioned above, the ozonized oxygen can be supplied at high pressure only to the adsorption/desorption tower, which contributes to more effective ozone storage.

In yet another preferred mode for carrying out the invention, the electric energy conversion/storage system may further be so arranged as to include an inert gas supply means for supplying an inert gas to the gas circulation system.

Owing to the arrangement mentioned above, the electric discharge can easily take place even under a high pressure. Thus, ozone gas can be produced with high efficiency while assuring effective utilization of electric energy.

In still another preferred mode for carrying out the invention, an argon gas should preferably be selected as the inert gas.

By using argon gas as the inert gas, the amount of heat-dissipated from the adsorbent upon ozone adsorption can be reduced, which in turn ensure utilization of electric energy with high efficiency with energy required for cooling the adsorbent being reduced.

In a further preferred mode for carrying out the invention, the ozone concentration control means mentioned previously may include an ozone densimeter for measuring an ozone concentration of the ozone containing gas, a first flow regulating valve for regulating a flow rate of the ozone containing gas taken out from the ozone adsorbing/desorbing means, a second flow regulating valve for regulating a flow rate of the ozone containing gas supplied to the ozone consumer, and a control means for controlling the first and second flow regulating valves on the basis of the ozone concentration. The control means may be so designed as to control the first and second flow regulating valves such that flow-path cross-sectional area of the first flow regulating valve is decreased while that of the second flow regulating valve is increased when the ozone concentration is higher than a predetermined ozone concentration. Further, the control means may be designed as to control the first and second flow regulating valves such that the flow-path cross-sectional area of the first flow regulating valve is increased while that of the second flow regulating valve is decreased when the ozone concentration is lower than the predetermined ozone concentration.

With the arrangement described above, ozone can be supplied to the ozone consumer steadily at a predetermined ozone flow rate.

In a yet further preferred mode for carrying out the invention, the ozone concentration control means may include an ozone densimeter for measuring an ozone concentration of the ozone containing gas, a depressurization regulating means for regulating depressurization required for taking out ozone from the ozone adsorbing/desorbing means, a flow regulating valve for regulating a flow rate of the ozone containing gas supplied to the ozone consumer, and a control means for controlling the depressurization regulating means and the flow regulating valve on the basis of the ozone concentration. The control means may be so designed as to control the depressurization regulating means and the flow regulating valve such that the depressurization is lowered while flow-path cross-sectional area of the flow regulating valve is increased when the ozone concentration is higher than a predetermined ozone concentration. Further, the control means may be so designed as to control the depressurization regulating means and the flow regulating valve such that the depressurization is intensified while the flow-path cross-sectional area of the flow regulating valve is decreased when the ozone concentration is lower than the predetermined ozone concentration.

With arrangement mentioned above, ozone can be delivered to the ozone consumer steadily at a predetermined flow rate.

In a still further preferred mode for carrying out the invention, the depressurization regulating means may include a gas ejector for extracting ozone from the ozone adsorbing/desorbing means by lowering the pressure within the ozone adsorbing/desorbing means, wherein the gas ejector may be comprised of a nozzle through which a compressed gas is caused to flow. The control means may be so designed as to control the depressurization by adjusting a diameter of the nozzle.

With the arrangement described above, ozone can be supplied to the ozone consumer stably by adjusting the nozzle diameter of the gas ejector.

In a further preferred mode for carrying out the invention, the depressurization regulating means may include a gas ejector for extracting ozone from the ozone adsorbing/ desorbing means by lowering the pressure within the ozone adsorbing/desorbing means, a bypass pipe disposed in parallel with the gas ejector, and a two-way flow regulating valve for regulating a flow ratio of compressed gas flow between the gas ejector and the bypass pipe. The control means may be so designed as to control the depressurization within the ozone adsorbing/desorbing means by regulating the compressed gas flow ratio by controlling the two-way flow regulating valve.

With the arrangement described above, supply of the ozone gas to the ozone consumer can be carried out steadily.

In another preferred mode for carrying out the invention, the electric energy conversion/storage system may further include a gas storing means for storing a compressed gas to be used for driving the gas ejector.

By employing the gas storing means mentioned above, the electric energy required for taking out ozone from the ozone adsorption/desorption tower can be reduced, whereby ozone can be delivered to the ozone consumer with high efficiency.

In yet another preferred mode for carrying out the invention, the gas storing means may be composed of a compressed gas storing tank.

By using the gas storing means mentioned above, the electric energy required for taking out ozone from the ozone adsorption/desorption tower can be reduced, whereby ozone can be delivered to the ozone consumer with high efficiency.

In still another preferred mode for carrying out the invention, the gas storing means can be comprised of an air liquidizing means for storing air in a liquidized state.

By using the gas storing means as mentioned above, the electric energy required for taking out ozone from the ozone adsorption/desorption tower can be reduced, whereby ozone can be delivered to the ozone consumer with high efficiency.

In a further preferred mode for carrying out the invention mentioned previously, the air liquidizing means may be disposed in association with the ozone adsorbing/desorbing means so that the air liquidizing means serves additionally as a coolant supply source for the ozone adsorbing/ desorbing means.

By employing the gas storing means as mentioned above, the electric energy required for taking out ozone from the ozone adsorption/desorption tower can be reduced, whereby ozone can be delivered to the ozone consumer with high efficiency.

The above and other objects, features and attendant effects and advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 6 is a table chart showing experimentally obtained results concerning ozone solving capacities of various solvents;

DESCRIPTION OF THE PREFERRED EMBODIMENTS

Figure 1:
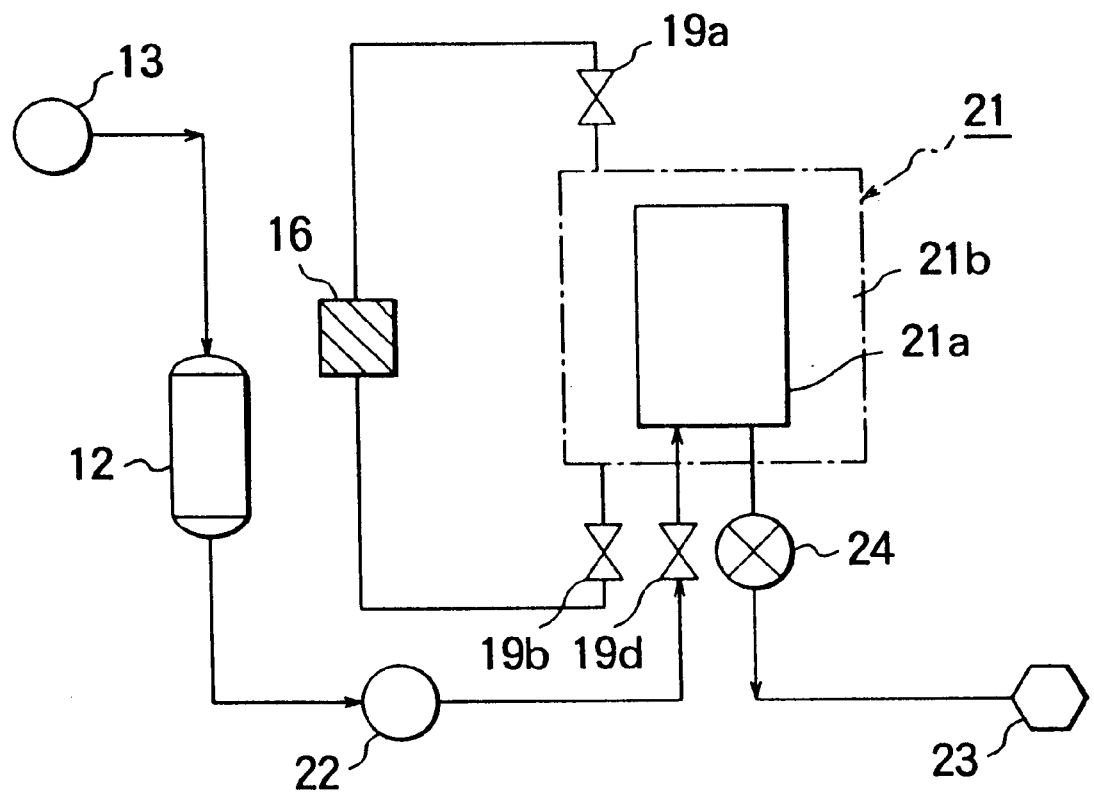
FIG. 1 is a schematic diagram showing generally a structure of an electric energy conversion/storage system according to a first embodiment of the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

Figure 20:
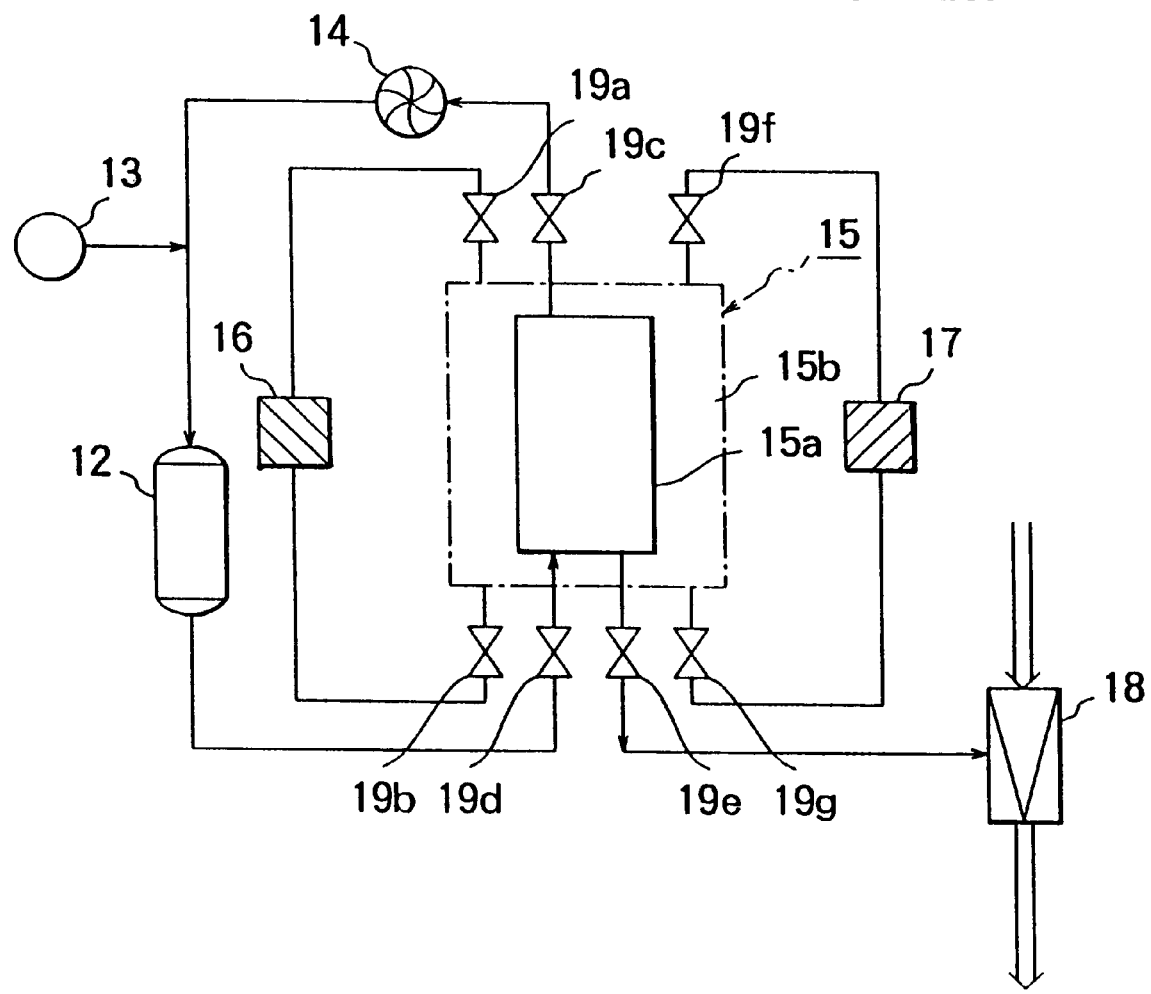
FIG. 20 is a schematic diagram showing a general arrangement of a conventional intermittent-operation type ozone supply system as another example of conventional electric energy conversion/storage systems employing an adsorption/desorption tower.

FIG. 1 is a schematic diagram showing generally a structure of an electric energy conversion/storage system according to a first embodiment of the invention. In the figure, reference characters 12, 13, 16, 19a, 19b and 19d denote components same as or equivalent to those described hereinbefore by reference to FIG. 20 by reference to FIG. 20. An ozone storing tank 21 functionally corresponds to the ozone adsorption/desorption tower 15 mentioned hereinbefore and is adapted to store ozone molecules from the ozonized oxygen gas generated by the ozone generator 12 for the storage of ozone molecules therein.

The electric energy conversion/storage system now under consideration further includes a gas compressing pump 22 for compressing the ozonized gas before being supplied to the ozone storing tank 21, an ozone consumer 23 destined for consuming ozone contained in the ozonized gas which is stored in the ozone storing tank 21, and a gas flow regulating valve 24 for supplying ozone contained in the ozone containing gas discharged from the ozone storing tank 21 to the ozone consumer 23 steadily or constantly at a predetermined flow rate.

The ozone storing tank 21 is implemented in a double-drum or double-cylinder structure including an inner tank 21a and an outer tank 21b, wherein the inner tank 21a defines a space for storing ozone molecules while the outer tank 21b is filled with a heat transfer medium for temperature regulation. In general, ethylene glycol or alcohols may be used as the heat transfer medium.

Furthermore, although not shown in the figure, a control unit (also referred to as the controller) is provided in association with the electric energy conversion/storage system for controlling sequentially individual processes involved in the ozone adsorption and desorption operation. More specifically, the ozone generator 12, the oxygen supplying source 13, the coolant supply source 16, the change-over valves 19a to 19d, the gas compressing pump 22 and the gas flow regulating valve 24 are adapted to be controlled by the control unit not shown.

Now, description will be made of an ozone storing operation and an ozone utilizing operation (ozone discharging operation) of the electric energy conversion/storage system according to the instant embodiment of the invention.

At first, in the ozone storing operation mode, the change-over valves 19a, 19b and 19d are opened, whereby an ozonized gas is supplied to the gas flow system as a raw gas for producing an ozonized oxygen gas.

The raw gas containing oxygen is introduced into the ozone generator 12, in which a part of oxygen molecules is transformed into ozone molecules (i.e., ozonized) under the effect of a silent electric discharge when the oxygen containing raw gas passes through an electric discharge gap defined between electrodes (not shown) disposed within the ozone generator 12, whereby an ozonized oxygen gas (i.e., an oxygen gas containing ozone molecules) is produced and forced to flow in the direction indicated by arrows by means of the gas compressing pump 22.

At this juncture, it should be added that the pressure of the raw gas charged for the ozone production is usually maintained at a level within a range of 1.5 to 2.0 kg/km$^2$ with a view to realizing a high the ozone production efficiency.

The ozonized oxygen gas generated in this way is compressed by means of the gas compressing pump 22 to be subsequently supplied to the ozone storing tank 21 for storage therein. Needless to say, the amount of ozone molecules which can be stored in the ozone storing tank 21 increases as the pressure of the ozonized oxygen gas becomes higher. Besides, the amount of storage of ozone increases as the temperature of the inner tank 21a becomes lower, assuming that decomposition of ozone molecules does not take place. For this reason, the ozone storing tank 21 is cooled by the coolant supply source 16. Additionally, by cooling the gas compressing pump 22 in the ozone adsorption operation mode, decomposition of ozone molecules is suppressed, rendering it possible to store ozone molecules with higher efficiency.

Upon completion of the ozone storing operation for the ozone storing tank 21, the operation of the electric energy conversion/storage system may make transition to the ozone discharging operation mode (i.e., ozone desorption operation mode).

In the ozone discharging operation mode, operations of the ozone generator 12, the gas compressing pump 22 and the coolant supply source 16 are stopped with the change-over valves 19-a to 19c being closed. Subsequently, the gas flow regulating valve 24 is put into operation, whereby the ozonized oxygen gas is discharged from the ozone storing tank 21 as the oxygen containing gas at a preset rate to be supplied to the ozone consumer 23 constantly at a predetermined flow rate. In this conjunction, a pressure regulating valve (not shown) may be additionally provided between the ozone storing tank 21 and the gas flow regulating valve 24 to thereby realize the aimed control with higher accuracy.

Additionally, description will be made of the influence of ozone concentration exerted to the storage of ozonized oxygen gas under compression by referring to FIG. 2 which shows an experimentally obtained characteristic curve representing a relation between ozone concentration (% by weight) of the ozonized oxygen gas and ozone decomposition ratio (%) on the condition that when the pressure of the ozonized oxygen gas compressed for storage in the ozone storing tank 21 is within a range of 5 to 20 kg/cm$^2$ with the temperature being set at 25° C.

Figure 2:
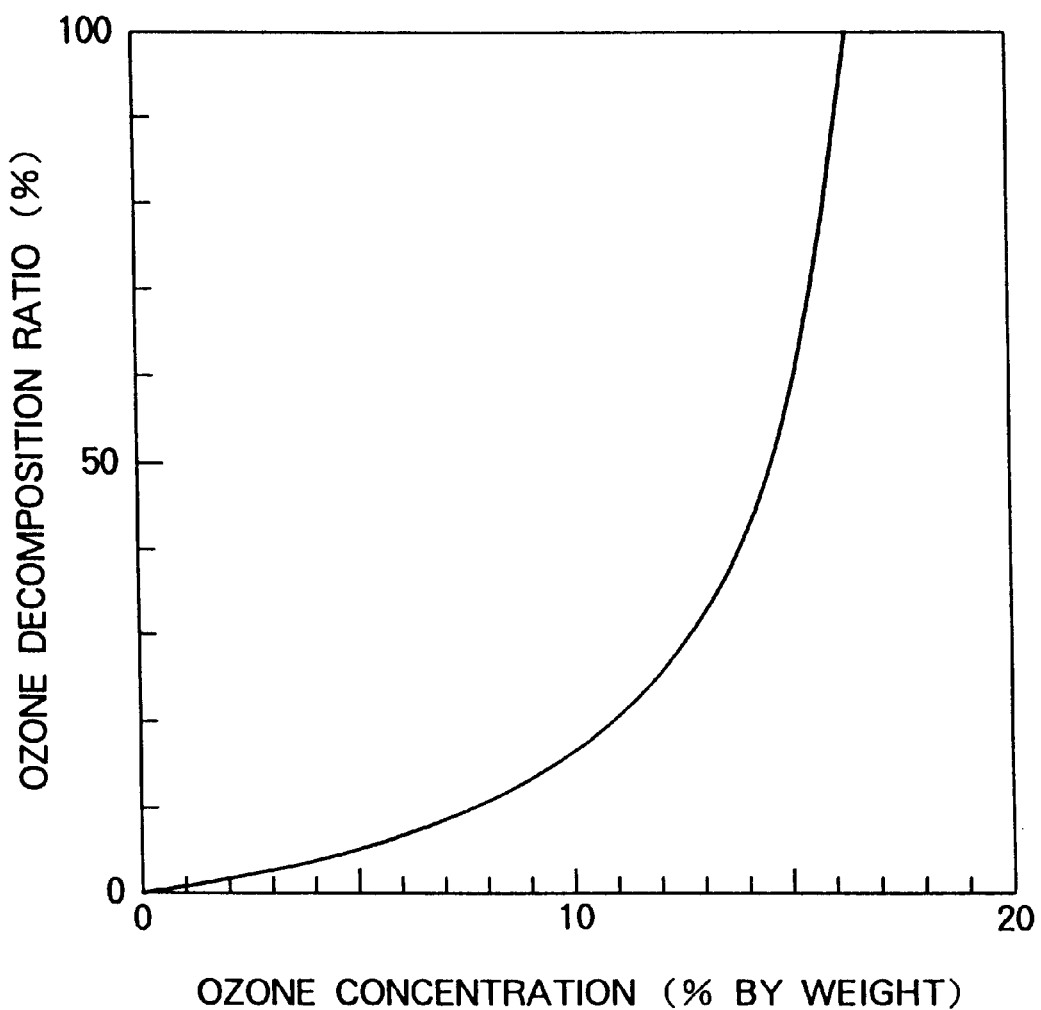
FIG. 2 is a characteristic diagram illustrating graphically a relation between ozone concentration and an ozone decomposition ratio.

As can be seen from FIG. 2, unless the ozone concentration is higher than 7% by weight, the ozone decomposition ratio is not higher than 10%, which means that ozone molecules are essentially insusceptible to decomposition at the concentration lower than 7%. On the other hand, when the ozone concentration exceeds 13% by weight, the ozone decomposition ratio increases to a value falling within a range of 80 to 90%. In other words, substantially all of ozone molecules undergo decomposition. It will further be seen that when the ozone concentration is in a range of 7 to 13% by weight, the ozone decomposition ratio falls within a range of 20 to 40%.

As will now be understood from the above, the ozone decomposition ratio remains substantially constant independent of the compression pressure if the ozone concentration remains constant, so long as the compression pressure of the ozonized oxygen gas is in a range of 5 to 20 kg/cm$^2$. Besides, when the ozone concentration is at 10% by weight, the ozone decomposition ratio remains invariable until the compression pressure of the ozonized oxygen gas has reached the level of 70 kg/cm$^2$.

In the course of the experiment described above, the ozone concentration of the ozonized oxygen gas and an ozone storage efficiency (i.e., amount of ozone molecules stored actually for use) has been experimentally determined in consideration of the fact that the amount of ozone molecules supplied to the ozone storing tank 21 increases in proportion to the ozone concentration of the ozonized oxygen gas. The result is graphically illustrated in FIG. 3.

Figure 3:
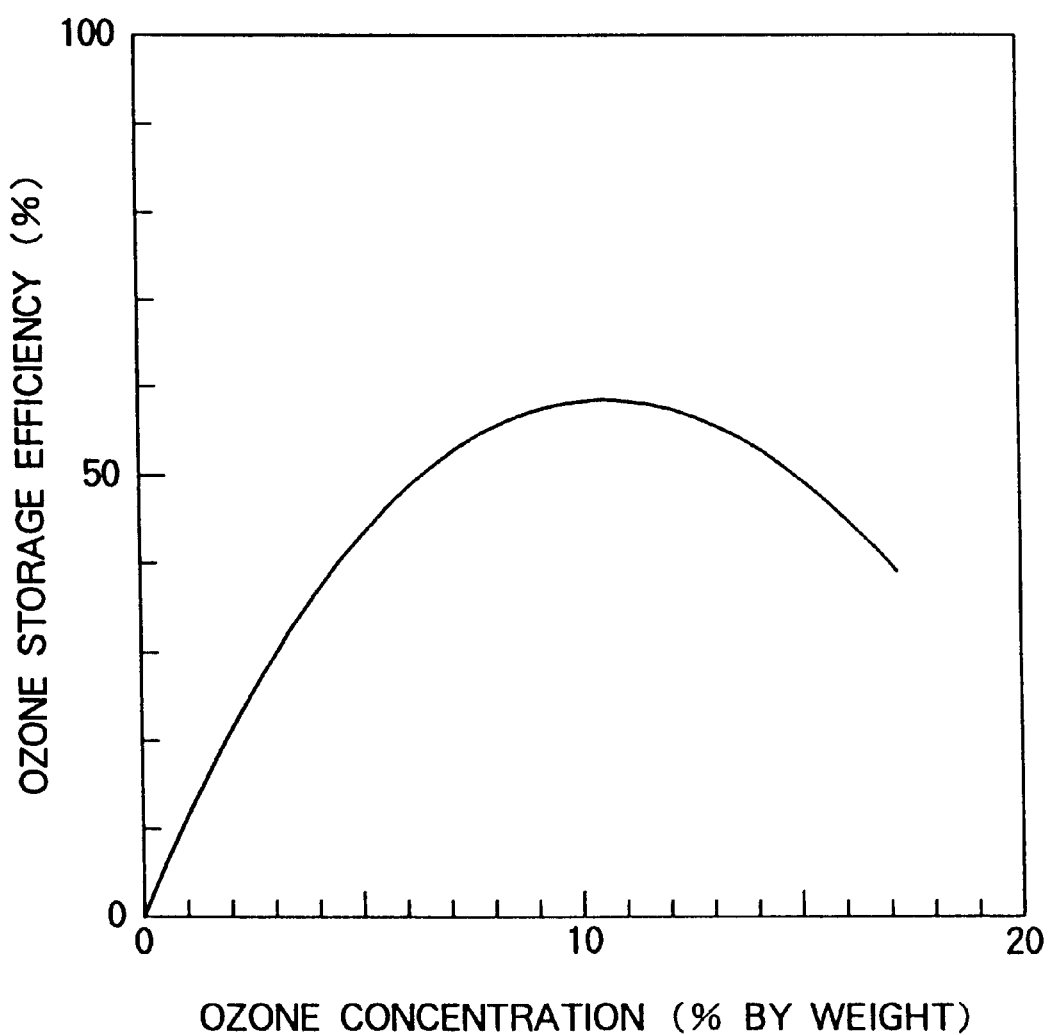
FIG. 3 is a characteristic diagram for illustrating graphically a relation between an ozone concentration of an ozonized oxygen gas and an ozone storage efficiency.

More specifically, FIG. 3 is a characteristic diagram for illustrating graphically a relation between the ozone concentration (% by weight) contained in the ozonized oxygen gas and the ozone storage efficiency (%). It can be appreciated from this figure that the ozone storage efficiency is highest when the ozone concentration of the ozonized oxygen gas is in a range of 10±3% by weight.

In the foregoing description of the electric energy conversion/storage system according to the first embodiment of the invention, it has been presumed that the oxygen gas is introduced into the ozone generator 12 by using the oxygen supplying source 13. However, it goes without saying that the similar ozone storing effect can equally be attained in the case where air is introduced into the ozone generator 12, even though it is admitted that the ozone production efficiency is higher when oxygen gas is used, as compared with the case where air is used as the raw gas for producing ozone molecules.

Next, the electric energy storage efficiency of the electric energy conversion/storage system according to the first embodiment of the invention which can be operated continuously for an extended duration will be described by comparing with the conventional water heater.

In the case of the conventional water heater, electric energy of ca. 70 kWhr/m$^3$ is consumed in transforming 1 m$^3$ of water having a temperature of 20° C. into hot water of 80° C. as whole.

By contrast, in the case of the electric energy converting/storing method and the electric energy conversion/storage system according to the instant embodiment of the invention, when ozone molecules are stored as an ozonized oxygen gas under such conditions that the ozone concentration is 10% by weight at a temperature of −80° C. and a storage pressure of 10 atm, it is possible to store the electric energy with significantly enhanced efficiency on the order of 150 kWhr/m$^3$, assuming that the ozone decomposition ratio is 30% with the ozone production efficiency being 10 Whr/g.

In this manner, the electric energy storage efficiency can remarkably be enhanced by storing electric energy in the form of the compressed ozone gas by converting electric energy into ozone molecules.

In this connection, the electric energy storing operation (ozone adsorbing operation) should preferably be performed during a time period such as during the night in which the electric power consumption is low because storage of the electric energy can then be realized with high efficiency, and because the electric energy consumed in storing ozone can be neglected during the night period.

On the other hand, the ozone utilizing operation (i.e., the ozone desorption operation mode) is effectuated during a period in which electric power consumption increases (e.g. during the day time). In this conjunction, the ozone discharging or delivery operation can be carried out most efficiently with the electric power required therefor being reduced to a possible minimum, i.e., with a maximum efficiency, to say in another way. In reality, the ozone discharging or delivery operation can be realized by opening and controlling only the gas flow regulating valve 24, for which only a small power consumption is involved.

Embodiment 2

In the electric energy conversion/storage system according to the first embodiment of the invention, the gas compressing pump 22 is disposed at a location downstream of the ozone generator 12, wherein a part of oxygen gas is converted into ozone molecules to thereby produce the ozonized oxygen gas (ozone containing gas) by the ozone generator 12, the ozonized oxygen gas being then compressed by the gas compressing pump 22 and stored in the ozone storing tank 21. However, the gas compressing pump 22 may be disposed at a location upstream of the ozone generator 12, as shown in FIG. 4.

Figure 4:
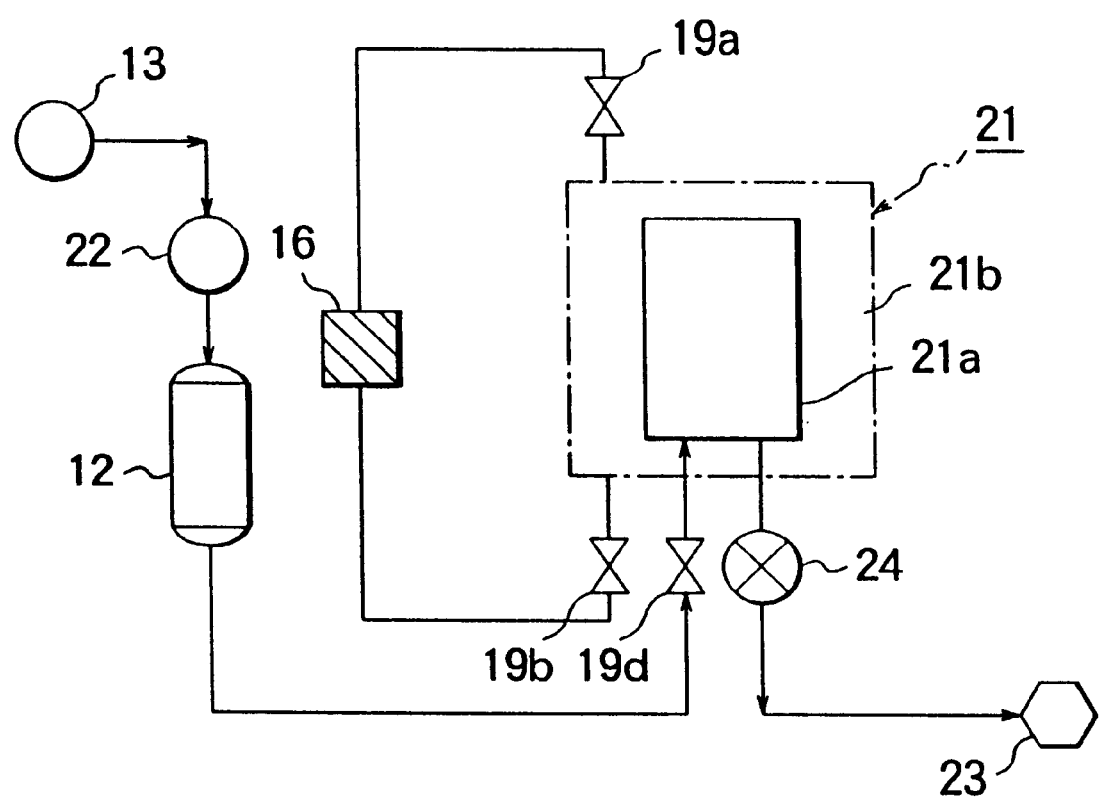
FIG. 4 is a diagram showing schematically and generally a structure of an electric energy conversion/storage system according to a second embodiment of the invention.

FIG. 4 is a diagram showing schematically and generally a structure of the electric energy conversion/storage system according to a second embodiment of the invention in which the gas compressing pump 22 is disposed upstream of the ozone generator 12.

Referring to FIG. 4, in the electric energy conversion/storage system according to the instant embodiment, the oxygen gas delivered from the oxygen supplying source 13 is compressed or pressurized by the gas compressing pump 22 to be subsequently introduced into the ozone generator 12. The ozonized oxygen gas produced by the ozone generator 12 is then supplied straightforwardly to the ozone storing tank 21.

By virtue of the arrangement described above, decomposition of ozone molecules within the gas compressing pump 22 can be avoided, whereby ozone can be stored with high efficiency.

At this juncture, it is however noted that in order to generate ozone in the highly pressurized state, as shown in FIG. 4, the specifications of the ozone generator 12 has to be so changed as to be capable of withstanding a high pressure. More specifically, the electric discharge gap length has to be shortened while a low temperature must be maintained for the electric discharge field e.g. by disposing a cooling device or the like in association with the ozone generator 12 for cooling the electric discharge field.

For the reason mentioned above, it is desirable in practical applications that the ozonized oxygen gas is first produced and then compressed before storage in the ozone storing tank 21 in order to store ozone with high efficiency. In other words, the arrangement shown in FIG. 1 is preferred over the one shown in FIG. 4 because of relative lower electric power required for storing ozone as well.

Embodiment 3

In the electric energy conversion/storage system according to the first embodiment of the invention, the ozonized oxygen gas produced by the ozone generator 12 is compressed and stored in the ozone storing tank 21. However, there is conceivable such an arrangement in which only ozone molecules contained in the ozonized oxygen gas are stored in an adsorbing/desorbing apparatus and ozone is taken out in a gaseous state as an ozone containing gas.

Figure 5:
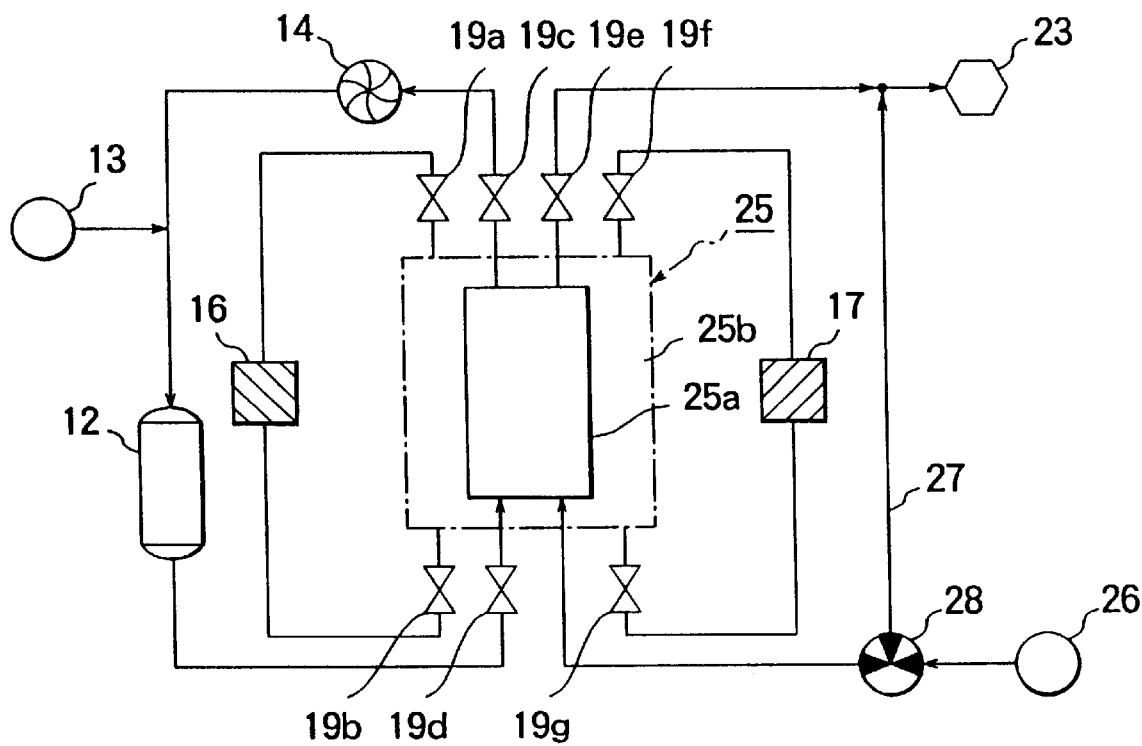
FIG. 5 is a schematic diagram showing generally a structure of an electric energy conversion/storage system according to a third embodiment of the present invention.

FIG. 5 is a schematic diagram showing generally a structure of the electric energy conversion/storage system according to a third embodiment of the invention which employs an ozone adsorption/desorption tower (ozone storing tank). In the figure, reference characters 12 to 14, 16, 17, 19a to 19g and 23 designate components same as or equivalent to those described hereinbefore by reference to FIGS. 1 and 20. An ozone storing tank 25 corresponds to the ozone adsorption/desorption tower 15 mentioned hereinbefore. In the instant case, solvent adsorption type ozone storing tank is employed.

In FIG. 5, reference numeral 26 denotes an oxygen supplying source for supplying an oxygen gas which is employed for taking out ozone stored in the ozone storing tank 25 as an ozone containing gas, 27 denotes a bypass pipe disposed in parallel with the ozone storing tank 25 between the exit port and the inlet port thereof for allowing a part of oxygen gas supplied from the oxygen supplying source 26 to flow through the bypass pipe 27 while bypassing the ozone storing tank 25. Further, reference numeral 28 denotes a two-way flow regulating valve 28 disposed at the exit side of oxygen supplying source 26 for the purpose of regulating the flow ratio between the flow rate of the oxygen gas flowing through the ozone storing tank 25 on one hand and that of the oxygen gas flowing through the bypass pipe 27 on the other hand. The ozone storing tank 25 is implemented in a double-drum or double-cylinder structure including an inner tank 25a and outer tank 25b, wherein the inner tank 25a is filled with an organic solvent such as fluorocarbon or the like while the outer tank 25b is filled with a heat transfer medium. In general, ethylene glycol, alcohols, brine or the like may be used as the heat transfer medium.

The control unit (not shown) for performing a sequential control in the ozone storing operation mode as well as in the ozone discharging operation mode is so designed or programmed as to control in addition to the components mentioned hereinbefore the circulating blower 14, the heating medium source 17, the change-over valve 19c, the change-over valves 19e to 19g, the oxygen supplying source 26 and the two-way flow regulating valve 28.

Description will now turn to operation of the electric energy conversion/storage system according to the third embodiment of the invention, as shown in FIG. 5.

At first, in the ozone storing operation mode, an oxygen gas is supplied to the gas circulation system including the ozone generator 12 and the ozone storing tank 25 from the oxygen supplying source 13 so that a predetermined pressure (in a range of 1.5 to 2.0 kg/cm$^2$) prevails constantly within the gas circulation system.

Furthermore, in the state in which the change-over valves 19c and 19d which are provided in the gas circulation system at the exit and entrance sides of the ozone storing tank 25, respectively, are opened, the circulating blower 14 is driven to cause the oxygen gas to flow through the gas circulation system. In that case, when the oxygen gas flow through the electric discharge gap provided internally of the ozone generator 12, a part of the oxygen gas is ozonized under the effect of the silent electric discharge, whereby an ozonized oxygen gas is produced to be fed to the ozone storing tank 25.

The solvent contained in the inner tank 25a of the ozone storing tank 25 solves selectively ozone molecules contained in the ozonized oxygen gas. The residual oxygen gas is fed back toward the circulating blower 14 by way of the change-over valve 19c.

The amount of oxygen consumed in production of ozone molecules by the ozone generator 12 during this process is supplemented from the oxygen supplying source 13 mentioned previously.

In this connection, the ozone storing medium which may be an organic solvent such as fluorocarbon has such a property that the ozone adsorption capacity thereof increases as the temperature thereof is lower. In consideration of this fact, the cooling temperature of the organic solvent is usually maintained at a level on the order of −120° C. by the coolant supplied from the coolant supply source 16.

Upon completion of ozone charging operation for the ozone storing tank 25, operation of the electric energy conversion/storage system is changed over to an ozone discharging operation mode.

In this case, at first, operations of the ozone generator 12, the circulating blower 14 and the coolant supply source 16 are stopped with the change-over valves 19a, 19b, 19c and 19d being closed.

Subsequently, the heating medium source 17 is put into operation with the change-over valves 19e, 19f and 19g being opened. Thus, the oxygen gas supplied from the oxygen supplying source 26 is introduced into the ozone storing tank 25 by way of-the two-way flow regulating valve 28.

As a result of this, ozone contained in the ozone storing tank 25 is discharged as an ozone containing gas to be supplied to the ozone consumer 23 by way of the change-over valve 19e. In that case, by adjusting the flow rate of the oxygen gas introduced into the ozone storing tank 25 from the oxygen supplying source 26 by means of the two-way flow regulating valve 28, the amount of ozone discharged from the organic solvent contained in the inner tank 25a is correspondingly regulated, whereby an ozone containing oxygen gas containing ozone at a predetermined concentration is discharged at a predetermined flow rate to be fed to the ozone consumer 23 at a substantially constant rate.

Next, referring to FIG. 6, description will be made concerning variety of solvents and ozone solving capacities thereof. Parenthetically, FIG. 6 is a table chart showing experimentally obtained results concerning ozone solving capacities (gram/liter) of various solvents. It can be understood that Freon 22 (R22) which is one of organic solvents has a high ozone solving or adsorbing capacity (i.e., 1050 g/l). It has been experimentally established that fluorocarbon is most effective organic solvent as the solvent for storage of ozone.

Next, electric energy storage efficiency of the system according to the instant embodiment of the invention which can be operated continuously for an extended duration will be described by comparing with the conventional water heater.

In the case of the conventional water heater, electric energy of ca. 70 kWhr/m$^3$ can be stored by converting or transforming 1 m$^3$ of water having a temperature of 20° C. into hot water of 80° C., as mentioned previously.

By contrast, in the case of the ozone storage system and the ozone storing method according to the instant embodiment of the invention, it is possible to store the electric energy of 150 kWhr/m$^3$ by solving ozone in Freon 22 with ozone decomposition ratio of 50% and ozone production efficiency of 10 Whr/g.

In this manner, the electric energy storage efficiency can remarkably be enhanced by converting electric energy into ozone and storing ozone by solving it in a solvent.

Embodiment 4

Figure 7:
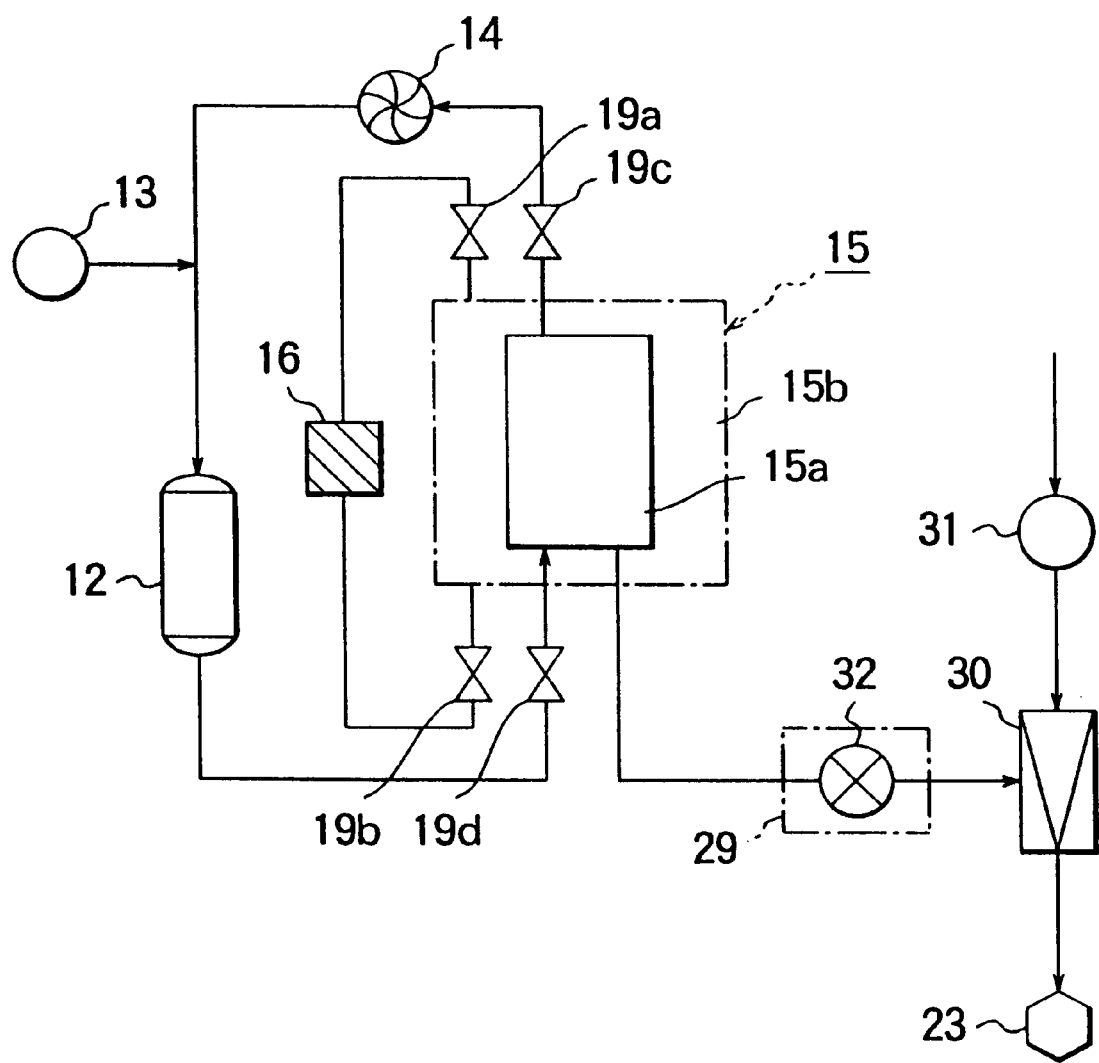
FIG. 7 is a schematic diagram showing generally a structure of an electric energy conversion/storage system according to a fourth embodiment of the present invention.

In the case of the electric energy conversion/storage system according to the third embodiment of the invention described above, the ozone storing tank 25 is employed as the adsorbing/desorbing apparatus for storing ozone. However, an ozone adsorption/desorption tower 15 may be employed, as in the case of the electric energy conversion/ storage system shown in FIG. 20. FIG. 7 is a schematic diagram showing generally a structure of the electric energy conversion/storage system according to a fourth embodiment of the invention in which an ozone adsorption/ desorption tower 15 is employed as the adsorbing/desorbing apparatus. In the figure, reference characters 12 to 16, 15a, 15b, 19a to 19d and 23 designate components same as or equivalent to those described hereinbefore.

In FIG. 7, reference numeral 29 denotes an ozone concentration regulating means disposed at the exit side of the ozone adsorption/desorption tower 15. The ozone concentration regulating means 29 serves as an ozone concentration control means for controlling the ozone gas taken out from the ozone adsorption/desorption tower 15 so that the ozone gas is supplied to the ozone consumer 23 constantly at a predetermined flow rate under the control of a control unit (not shown).

Further, a gas ejector 30 is installed at a location downstream of the ozone concentration regulating means 29. The gas ejector 30 cooperates with the ozone concentration regulating means 29 to constitute an ozone discharging means. More specifically, a compressed gas (described later on) is caused to flow through the gas ejector 30, whereby the inner space of the ozone adsorption/desorption tower 15 is depressurized so that ozone taken out by desorption from the ozone adsorption/desorption tower 15 can be fed to an ozone consumer as an ozone containing gas.

Installed at an inlet side of the gas ejector 30 is a compressed gas generator 31 which generates a compressed gas flow supplied to the gas ejector 30 for driving the same.

The ozone concentration regulating means 29 incorporates therein an ozone gas flow regulating valve 32 which is adapted to be operated manually or automatically for regulating or adjusting the flow rate of the ozone containing gas discharged from the ozone adsorption/desorption tower 15.

The control unit (not shown) for performing a sequential control in the ozone adsorbing operation mode as well as in the ozone desorbing operation mode is so designed or programmed as to control in addition to the components mentioned hereinbefore the gas ejector 30, the compressed gas generator 31 and the ozone gas flow regulating valve 32 incorporated in the ozone concentration regulating means 29.

Now, referring to FIG. 7, description will be directed to operation of the electric energy conversion/storage system according to the fourth embodiment of the invention.

At first, in the ozone adsorbing operation mode for generating ozone and storing it in the ozone adsorption/ desorption tower 15 by adsorption, an oxygen gas is supplied to the gas circulation system at a predetermined pressure in the same way described previously with change-over valves 19c and 19d being opened, while causing the oxygen gas to flow through the gas circulation system, whereby an ozonized oxygen gas is produced from the ozone generator 12 to be fed to the ozone adsorption/ desorption tower 15.

An ozone adsorbent charged in an inner cylinder 15a of the ozone adsorption/desorption tower 15 and cooled to a temperature not higher than −40° C. by means of the coolant supply source 16 adsorbs selectively ozone molecules contained in the ozonized oxygen gas. The residual oxygen gas is fed back toward the circulating blower 14 by way of the change-over valve 19c.

Incidentally, it is preferred to select as the adsorbent a material which is less susceptible to decomposition upon contact with ozone. As a preferred material to this end, a porous material impregnated with fluorocarbon, silica gel or activated alumina or a mixture thereof may be mentioned.

When ozone adsorption of the adsorbent charged in the adsorption/desorption tower 15 reaches a saturated adsorption level or state, operation of the electric energy conversion/storage system can be changed over to the ozone desorbing operation mode. To this end, operations of the ozone generator 1, the circulating blower 3 and the coolant supply source 16 are stopped with the change-over valves 19a to 19d being closed.

Subsequently, the compressed gas generator 31 is put into operation with a compressed gas being fed to the gas ejector 30. At the same time, the ozone gas flow regulating valve 32 incorporated in the ozone concentration regulating means 29 is opened gradually. Additionally, the flow rate of the compressed gas passing through a nozzle incorporated in the gas ejector 30 is increased progressively.

In this manner, the interior of the ozone adsorption/ desorption tower 15 is gradually depressurized for desorbing ozone. In the gas ejector 30, ozone discharged from the ozone adsorption/desorption tower 15 is mixed with the compressed gas supplied from the compressed gas generator 31 to be delivered to the ozone consumer 23 in the form of an ozone containing gas steadily at a predetermined rate.

At this juncture, the electric energy converting/storing method according to which the flow rate of the ozone gas is controlled through cooperation of the ozone concentration regulating means 29 and the gas ejector 30 will be compared with an electric energy converting/storing method in which the flow rate of the ozone containing gas is not controlled.

In general, unless the flow rate of the ozone containing oxygen gas taken out from the ozone adsorption/desorption tower 15 in the ozone desorption operation mode, a large amount of ozone is taken out from the ozone adsorption/ desorption tower 15 during the initial phase of the ozone desorption operation mode, whereon the amount of ozone discharged from the ozone adsorption/desorption tower 15 decreases gradually as a function of time lapse.

By contrast, when the electric energy converting/storing method according to the fourth embodiment of the invention is adopted, the amount of ozone containing oxygen gas taken out from the ozone adsorption/desorption tower 15 increases progressively because the ozone gas flow regulating valve 32 incorporated in the ozone concentration regulating means 29 is opened gradually.

Additionally, by increasing the flow rate of the compressed gas passing through the nozzle of the gas ejector 30 by decreasing gradually the nozzle diameter, the pressure prevailing within the ozone adsorption/desorption tower 15 can be gradually reduced.

Thus, decreasing in the amount of ozone desorbed as a function of time lapse can be canceled out by the flow rate control described above, whereby an ozone containing oxygen gas containing ozone at a predetermined concentration can be fed to the ozone consumer 23 at a substantially constant rate.

Now, comparison will be made with a conventional electric energy storing technique. In the case of the conventional water heater described hereinbefore, electric energy of ca. 70 kWhr/m$^3$ can be stored by converting or transforming 1 m$^3$ of water having a temperature of 20° C. into hot water of 80° C. By contrast, in the case of the electric energy conversion/storage system and method according to the fourth embodiment of the invention described above, it is possible to store the electric energy with significantly enhanced efficiency on the order of 730 kWhr/m$^3$ on the conditions that the ozone concentration is 13.5% by weight, storage temperature is −80° C. and the storage pressure is 2 atm, assuming that the ozone decomposition ratio is 30% and that the ozone generation efficiency is 10 Whr/g.

Thus, the electric energy conversion/storage efficiency can remarkably be enhanced by converting electric energy into ozone and adsorbing ozone by the adsorbent for storage thereof.

In the electric energy conversion/storage system described above, temperature of the adsorbent is not controlled for the purpose of reducing electric energy consumed for desorbing ozone. However, it should be understood that temperature control of the adsorbent may preferably be carried out in the ozone desorption operation mode. In that case, the amount of electric power demand increases by an amount required for the desorption of ozone. However, control of the amount of ozone desorbed can be facilitated, whereby the ozone containing gas which carries ozone molecules at a predetermined or desired concentration can be supplied to the ozone consumer 23 with an enhanced accuracy.

Further, in the electric energy conversion/storage system described above, a single ozone adsorption/desorption tower 15 is employed. However, a plurality of ozone adsorption/desorption towers 15 may be installed-in parallel with one another. In the electric energy conversion/storage system where a plurality of ozone adsorption/desorption towers 15 are provided in parallel as mentioned above, there can be realized such advantageous ozone discharging operation that the ozone containing gas containing ozone at a predetermined concentration can be fed to the ozone consumer more stably because it is then possible that when amount of ozone discharged from a given one of the ozone adsorption/desorption towers 15, then the ozone gas flow regulating valve 32 connected to another one of the ozone adsorption/desorption towers 15 is opened to thereby mix the ozone gas flows discharged from the two ozone adsorption/desorption towers 15 to supply the mixed or combined ozone gases to the gas ejector 30.

Furthermore, in the electric energy conversion/storage system described above, ozone is desorbed by lowering the pressure prevailing within the ozone adsorption/desorption tower 15 by means of the gas ejector 30 and the compressed gas generator 31, wherein ozone as desorbed is mixed with a carrier gas supplied from the compressed gas generator 31 to be supplied to the ozone consumer 23 in the form of the ozone containing gas. However, as a modification of the instant embodiment of the invention, a vacuum pump (not shown) may be provided for desorbing ozone from the adsorbent charged in the ozone adsorption/desorption tower 15. In this case, desorption of ozone is promoted under depressurization of the vacuum pump. The ozone gas discharged from the ozone adsorption/desorption tower 15 can then be mixed with a gas in a mixer (not shown) to be supplied to the ozone consumer 23 as an ozone containing gas.

The arrangement of the electric energy conversion/storage system described above may possibly involve an increased cost of equipment because of additional provision of the vacuum pump. However, advantageous effects comparable to those mentioned hereinbefore can be obtained.

Furthermore, as in the case of the electric energy conversion/storage system according to the third embodiment of the invention (see FIG. 5), a gas may be fed to the ozone adsorption/desorption tower 15 from an external gas supply source to thereby extract ozone as an ozone containing gas to be fed to the ozone consumer 23. In this conjunction, it is however noted that when other gas than an oxygen gas is fed to the ozone adsorption/desorption tower 15, there may arise such possibility that the amount of ozone adsorbed in the succeeding process decreases due to the property of the adsorbent. Accordingly, as the gas fed into the ozone adsorption/desorption tower 15, it is preferred to employ an oxygen gas.

Embodiment 5

In the electric energy conversion/storage system according to the fourth embodiment of the invention described above, the nozzle diameter (i.e., flow-path cross-sectional area) of the gas ejector 30 is gradually decreased to thereby increase depressurization within the ozone adsorption/desorption tower 15. However, essentially to the same effect, a bypass pipe may be provided in parallel with the gas ejector 30 and the gas flow rate in the bypass pipe may be controlled by employing a two-way flow rate regulating valve.

Figure 8:
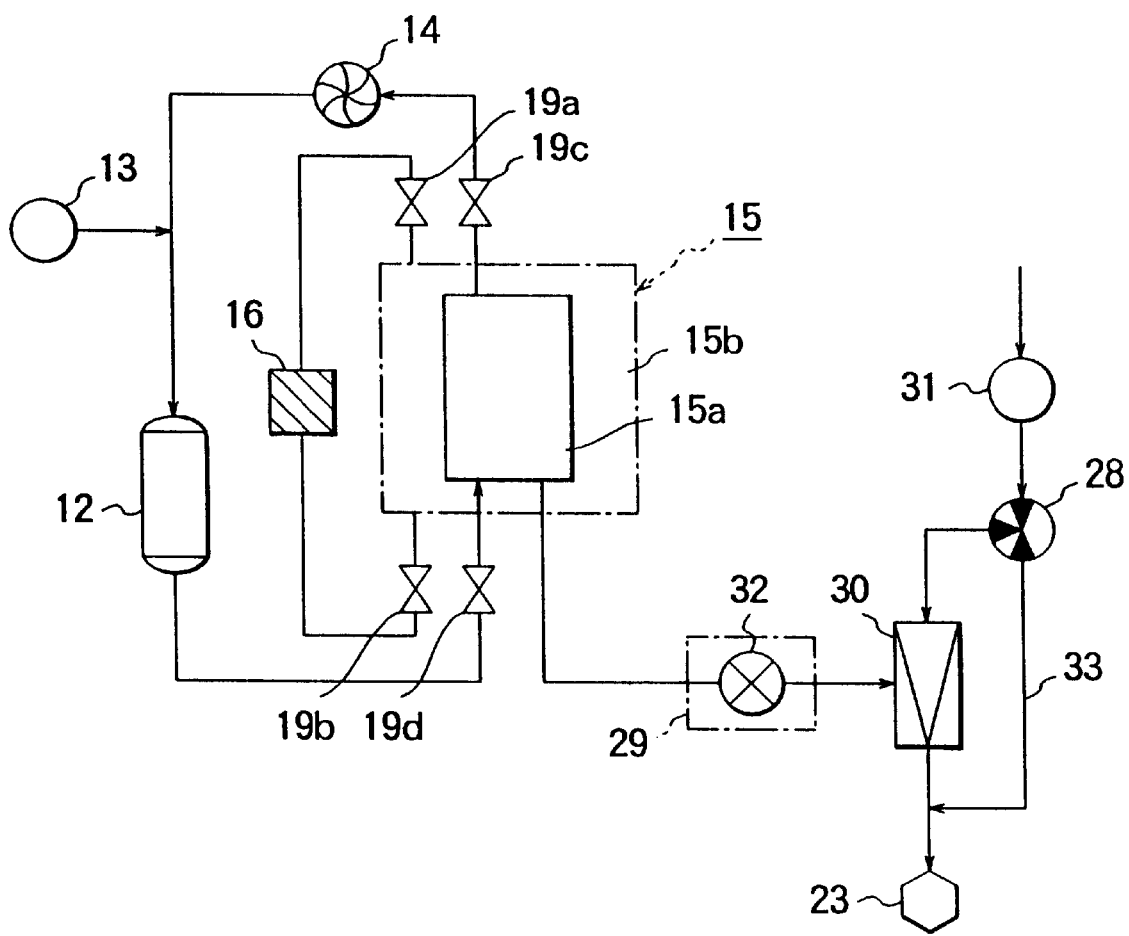
FIG. 8 is a schematic diagram showing generally a structure of an electric energy conversion/storage system according to a fifth embodiment of the present invention.

FIG. 8 is a schematic diagram showing generally a structure of the electric energy conversion/storage system according to a fifth embodiment of the invention in which a bypass pipe is provided in parallel with the gas ejector 30. In the figure, reference characters 12 to 16, 15a, 15b, 19a to 19d, 23 and 28 to 32 designate components same as or equivalent to those described hereinbefore by reference to FIGS. 5 and 7. Accordingly, repetitive description of these components will be unnecessary.

In FIG. 8, reference numeral 33 denotes a bypass pipe disposed in parallel with the gas ejector 30 through which a part of the compressed gas generated by the compressed gas generator 31 can flow by bypassing the gas ejector 30.

The two-way flow regulating valve 28 is interposed between the compressed gas generator 31 on one hand and the gas ejector 30 and the bypass pipe 33 on the other hand, wherein a first outlet port of the two-way flow regulating valve 28 is connected to the inlet port of the gas ejector 30 with a second outlet port of the two-way flow regulating valve 28 being hydraulically connected or communicated to the outlet port or the gas ejector 30 by way of the bypass pipe 33.

A control unit (not shown) for performing a sequential control in the ozone adsorbing operation mode as well as in the ozone desorbing operation mode is so designed or programmed as to control the two-way flow regulating valve 28 in addition to the components mentioned hereinbefore.

Now, referring to FIG. 8, description will be directed to operation of the electric energy conversion/storage system according to the fifth embodiment of the invention. In this connection, it is to be mentioned that the operation of the electric energy conversion/storage system in the ozone adsorbing operation mode is similar to that of the electric energy conversion/storage system according to the fourth embodiment of the invention. Accordingly, repeated description with regard to the ozone adsorption operation is omitted.

When the ozone adsorption of the adsorbent charged in the adsorption/desorption tower 15 approaches a saturated adsorption level or state, operation of the electric energy conversion/storage system can be changed over to the ozone desorbing operation mode. Accordingly, operations of the ozone generator 1, the circulating blower 3 and the coolant supply source 16 are stopped with the change-over valves 19a to 19d being closed.

Subsequently, the compressed gas generator 31 is put into operation with a compressed gas being fed to the gas ejector 30 by way of the two-way flow regulating valve 28. At the same time, the gas ejector 30 is put into operation and the ozone gas flow regulating valve 32 is opened gradually. In this manner, the interior of the ozone adsorption/desorption tower 15 is gradually depressurized for allowing desorption of ozone. In the gas ejector 30, ozone discharged from the ozone adsorption/desorption tower 15 is mixed with the compressed gas by the gas ejector 30 to be supplied to the ozone consumer 23 in the form of an ozone containing gas.

Here, description will be made in concrete concerning the ozone desorption process carried out through cooperation of the two-way flow regulating valve 28, the gas ejector 30 and the bypass pipe 33.

As described previously, upon ozone discharging operation, the ozone gas flow regulating valve 32 incorporated in the ozone concentration regulating means 29 is opened gradually, as a result of which the amount of the ozone containing oxygen gas extracted from the ozone adsorption/desorption tower 15 increases correspondingly.

On the other hand, the two-way flow regulating valve 28 controls the ratio between the flow rates of the compressed gases flowing through the gas ejector 30 and the bypass pipe 33, respectively, such that the flow rate of the compressed gas flowing through the bypass pipe 33 decreases gradually while allowing the flow rate of the compressed gas flowing through the gas ejector 30 to increase progressively, as a result of which the pressure prevailing within the ozone adsorption/desorption tower 15 is gradually reduced or evacuated.

In the electric energy conversion/storage process described above, temperature of the adsorbent is not controlled with a view to reducing the electric energy consumed for the ozone desorbing operation. However, it should be understood that temperature control of the adsorbent may preferably be carried out in the ozone desorption operation mode for the purpose of facilitating the control of the amount of ozone desorbed, as described previously. In that case, the ozone containing gas of a predetermined ozone concentration can be supplied to the ozone consumer 23 with an enhanced accuracy.

Furthermore, so far as increase in the cost of equipment and complication of the control process involved can be neglected, the compressed gas flow rate control device (not shown) may be installed not only in the pipe having the gas ejector 30 installed therein but also in the bypass pipe 33 for thereby controlling individually the flow rates in the pipes mentioned above while maintaining to be constant the flow rate of the ozone containing gas supplied to the ozone consumer 23. With this arrangement, the ozone concentration control can be realized with much enhanced accuracy.

Embodiment 6

In the electric energy conversion/storage system according to the fifth embodiment of the invention described, no consideration is paid to the pressure of the ozonized gas in the ozone-adsorption operation mode. However, it goes without saying that the pressure within the ozone adsorption/desorption tower 15 may be increased in the ozone adsorption operation mode for enhancing the ozone adsorption efficiency.

Figure 9:
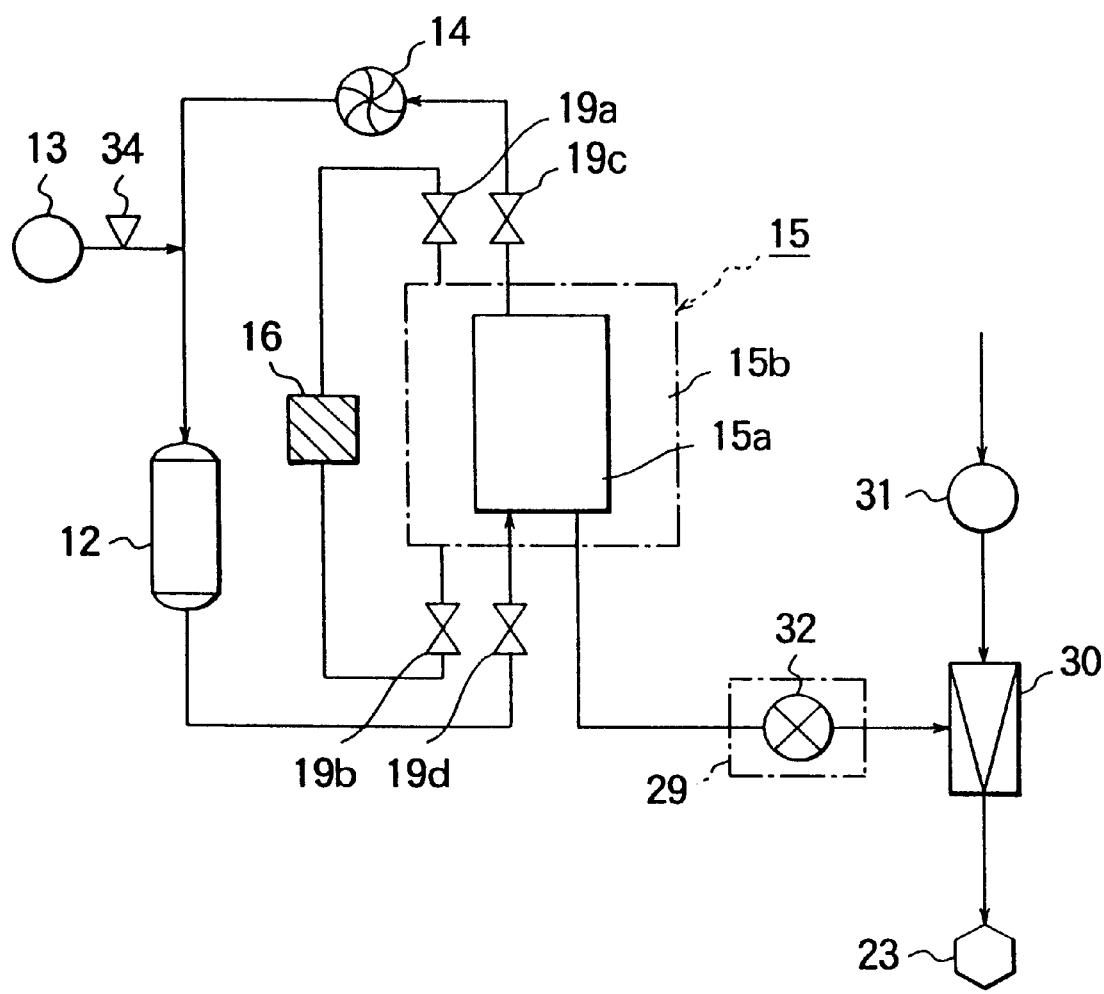
FIG. 9 is a schematic diagram showing generally a structure of an electric energy conversion/storage system according to a sixth embodiment of the present invention.

FIG. 9 is a schematic diagram showing generally a structure of the electric energy conversion/storage system according to a sixth embodiment of the invention in which a pressure sustaining unit is provided for increasing the pressure within the ozone adsorption/desorption tower 15 as well as the gas circulation system. In the figure, reference characters 12 to 16, 15a, 15b, 19a to 19d, 23 and 29 to 32 designate components same as or equivalent to those described hereinbefore by reference to FIG. 7. Accordingly, repetitive description of these components will be unnecessary.

In FIG. 9, reference numeral 34 denotes a pressure sustaining unit provided for pressurizing the gas circulation system for the purpose of sustaining a high pressure within the ozone generator 12. The pressure sustaining unit 34 is interposed between the oxygen supplying source 13 and the gas circulation system.

In the electric energy conversion/storage system now under consideration, the ozone generator 12 is designed to withstand a high pressure so that ozone can be generated at a high pressure. Accordingly, the electric discharge gap length is decreased. Besides, a cooling means is provided for maintaining the electric discharge field at a low temperature.

Furthermore, the control unit for performing a sequential control in the ozone adsorbing operation modes as well as in the ozone desorbing operation mode is so programmed as to control the pressure sustaining unit 34 in addition to the components mentioned hereinbefore.

Now, referring to FIG. 9, description will be directed to operation of the electric energy conversion/storage system according to the sixth embodiment of the invention. In this connection, it is to be mentioned that the operation of the electric energy conversion/storage system in the ozone desorbing operation mode is similar to that of the electric energy conversion/storage system according to the fourth embodiment of the invention. Accordingly, repeated description concerning the ozone desorbing operation is omitted.

In the ozone adsorption operation mode, an oxygen gas is supplied from the oxygen supplying source 13. In that case, the oxygen gas is pressurized by means of the pressure sustaining unit 34 to be fed to the gas circulation system including the ozone generator 12, the circulating blower 14 and the ozone adsorption/desorption tower 15 so that a predetermined high pressure can be constantly maintained in the gas circulation system.

When the oxygen gas is forced to flow through the gas circulation system by driving the circulating blower 14 with the change-over valves 19c and 19d being opened, a part of the oxygen gas flowing through the gas circulation system is transformed into ozone when the oxygen gas flows through the ozone generator 12, whereby an ozonized oxygen gas is produced to be subsequently transported to the adsorption/desorption tower 15. The adsorbent charged in the ozone adsorption/desorption tower 15 adsorbs selectively only ozone molecules from the ozonized oxygen gas with a residual part of the oxygen gas being fed back toward the circulating blower 14 through the change-over valve 19c. The amount of oxygen consumed in the production of ozone is supplemented from the oxygen supplying source 13.

The ozone adsorption/desorption tower 15 is cooled to a temperature not hither than −40° C. by means of the coolant supply source 16 with the aim to increase the ozone adsorbing capacity of the adsorbent. Incidentally, it is preferred to select as the adsorbent a material which is less susceptible to decomposition. As a preferred material to this end, there may be mentioned one selected from a group consisting of a porous material impregnated with fluorocarbon, silica gel, activated alumina and a mixture thereof.

Figure 10:
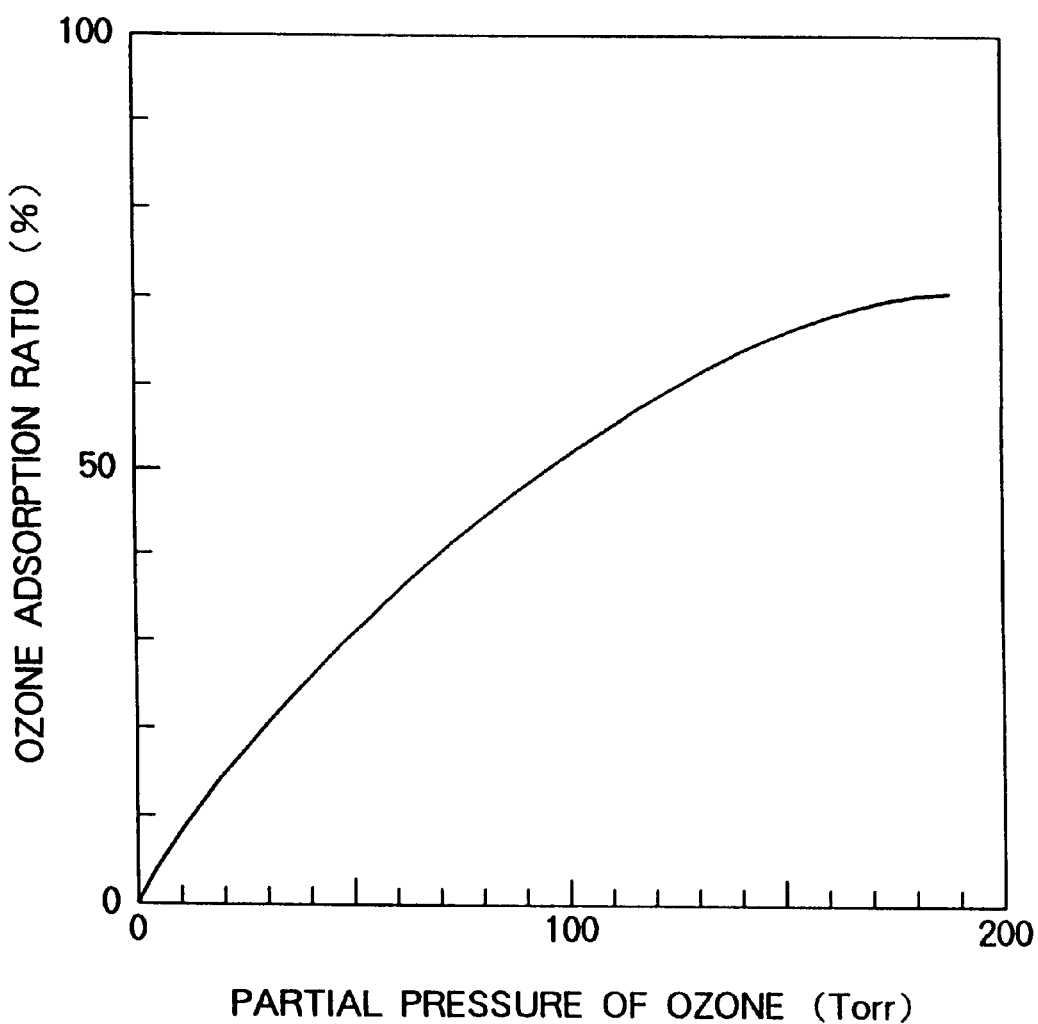
FIG. 10 is a characteristic diagram showing a relation between an ozone partial pressure of an ozonized oxygen and an ozone adsorption efficiency.

Next, influence of the pressure prevailing within the ozone adsorption/desorption tower 15 in the ozone adsorption operation mode will be considered by reference to FIG. 10 which illustrates graphically a characteristic relation between the ozone adsorption efficiency (%) of the ozone adsorption/desorption tower 15 and the ozone partial pressure (Torr) of the ozonized gas fed to the ozone adsorption/desorption tower 15. Parenthetically, the relation shown in FIG. 10 has been experimentally established.

As is apparent from FIG. 10, the ozone adsorption efficiency increases as the ozone partial pressure becomes higher. Accordingly, by setting the ozone partial pressure at a high level around 200 Torr by pressuring the interior of the ozone adsorption/desorption tower 15, ozone molecules can be stored with high efficiency.

However, when the pressure within the ozone adsorption/desorption tower 15 is increased excessively high, the partial pressure of oxygen contained in the ozonized oxygen increases correspondingly. In that case, the ozone adsorption rate becomes lower as the oxygen adsorption rate increases. Besides, it has been also experimentally established that the amount of ozone produced by the ozone generator 12 decreases as the pressure within the gas circulation system increases.

For the reasons mentioned above, it is preferred from the standpoint of realizing optimal ozone storage efficiency to set the pressure within the ozone adsorption/desorption tower 15 in a range of 2 to 5 $kg/cm^2$ in terms of the high as the atmospheric pressure) in order to realize the highest efficiency of ozone storage.

Embodiment 7

In the electric energy conversion/storage system according to the sixth embodiment of the invention described above, an oxygen gas is once supplied to the gas circulation system from the oxygen supplying source 13 at a high pressure and at a predetermined flow rate by way of the pressure sustaining unit 34 in an effort to maintain a high pressure within the ozone adsorption/desorption tower 15, wherein a part of the oxygen gas is transformed into ozone under a high pressure. In this conjunction, a pressure sustaining unit may be installed in a pipe connecting the ozone generator 12 and the ozone adsorption/desorption tower 15 to each other. In that case, it is unnecessary to change the specifications of the ozone generator 12.

Figure 11:
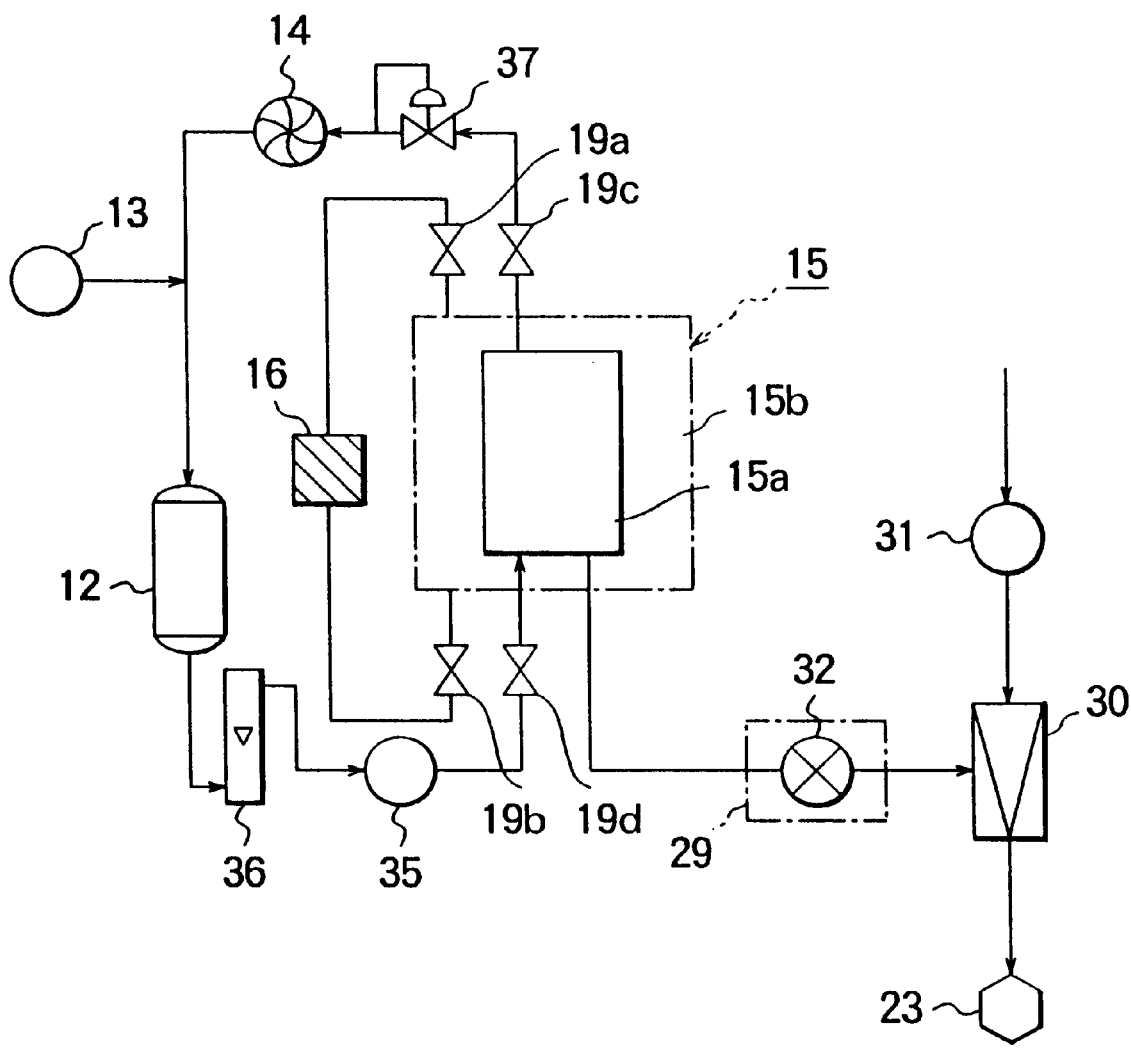
FIG. 11 is a schematic diagram showing generally a structure of an electric energy conversion/storage system according to a seventh embodiment of the present invention.

FIG. 11 is a schematic diagram showing generally a structure of the electric energy conversion/storage system according to a seventh embodiment of the invention in which a pressure sustaining unit is provided between the ozone generator 12 and the ozone adsorption/desorption tower 15. In the figure, reference characters 12 to 16, 15a, 15b, 19a to 19d, 23 and 29 to 32 designate components same as or equivalent to those described hereinbefore by reference to FIGS. 7 to 9. Accordingly, repetitive description of these components is omitted.

Referring to FIG. 11, disposed upstream of the change-over valve 19b is a pressurizing pump 35 which serves as a pressure sustaining unit for sustaining constantly a high pressure for the ozonized gas to be introduced into the ozone adsorption/desorption tower 15. On the other hand, a flow meter 36 disposed at a location upstream of the pressurizing pump 35 serves for controlling to be constant the flow rate of the ozonized gas introduced into the ozone adsorption/desorption tower 15.

Further, disposed at the location downstream of the change-over valve 19a in a pipe interconnecting the ozone adsorption/desorption tower 15 and the circulating blower 14 is a back pressure valve 37 which serves for reducing the pressure of the oxygen gas introduced into the ozone generator 12 by way of the circulating blower 14.

Incidentally, the control unit for performing a sequential control in the ozone adsorbing operation mode as well as in the ozone desorbing operation mode is so programmed as to control the pressurizing pump 35, the flow meter 36 and the back pressure valve 37 in addition to the components mentioned hereinbefore.

With the arrangement in which the flow meter 36 and the pressurizing pump 35 are provided at the entrance side of the ozone adsorption/desorption tower 15 with the back pressure valve 37 being installed at the exit side of the ozone adsorption/desorption tower 15, as shown in FIG. 11, to thereby sustain high only the pressure prevailing within the ozone adsorption/desorption tower 15, storage of ozone can be achieved with high efficiency.

Although the flow meter 36 is employed for controlling to be constant the flow rate of the ozonized oxygen gas introduced into the ozone adsorption/desorption tower 15, the flow meter 36 may be spared so long as the flow rate of the oxygen gas driven by the circulating blower 14 is constant.

Additionally, the pressurizing pump 35 may be so implemented as to serve for the function of the circulating blower 14 as well, to thereby cause the pressurizing pump 35 to circulate the oxygen gas and the ozonized oxygen gas through the gas circulation system. Then, the circulating blower 14 may, of course, be spared.

Embodiment 8

In the case of the electric energy conversion/storage system according to the first to seventh embodiments of the invention, only the oxygen gas is used as the raw gas to be introduced into the ozone generator 12. However, an inert gas may be fed to the ozone generator 12 in addition to the oxygen gas for promoting the ozonization in the ozone generator 12.

Figure 12:
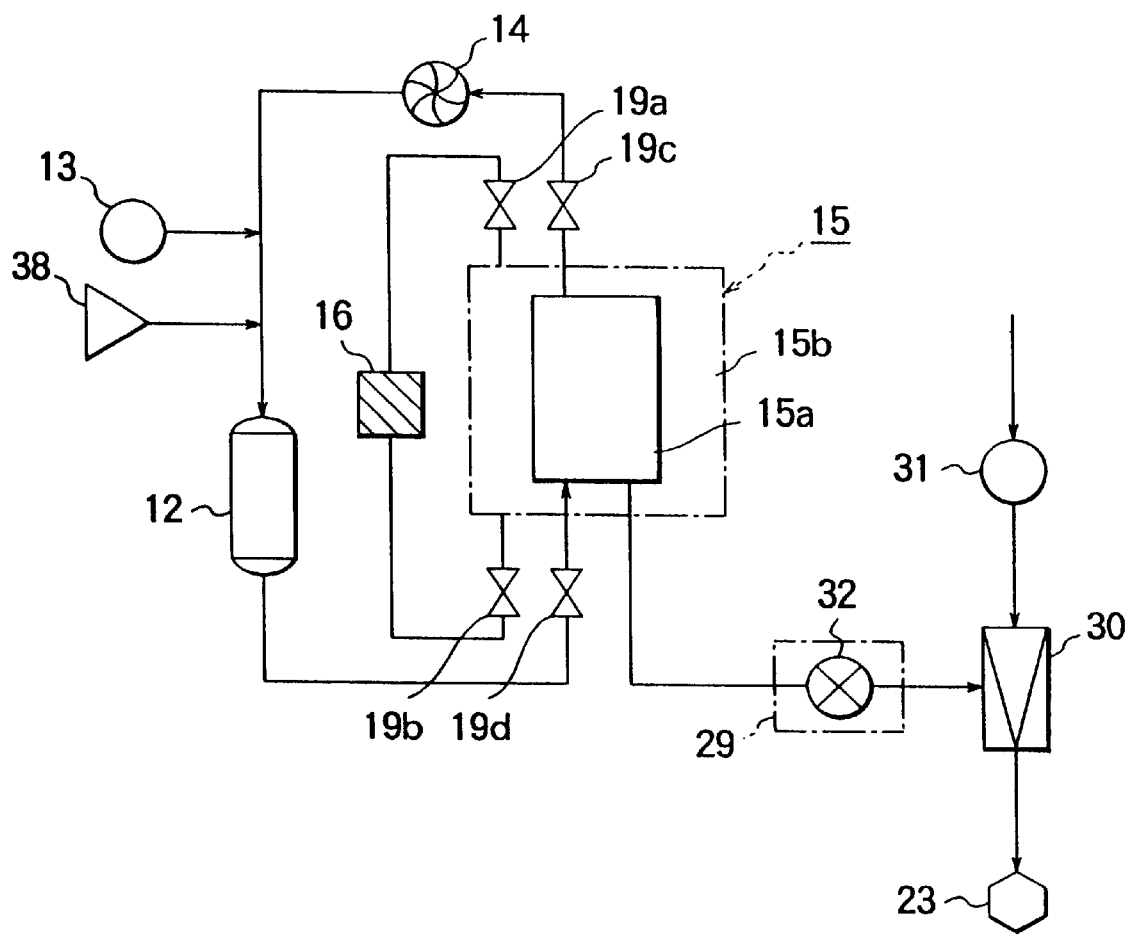
FIG. 12 is a schematic diagram showing generally a structure of an electric energy conversion/storage system according to an eighth embodiment of the present invention.

FIG. 12 is a schematic diagram showing generally a structure of the electric energy conversion/storage system according to an eighth embodiment of the invention in which a means for supplying an inert gas to the gas circulation system is provided. In the figure, reference characters 12 to 16, 15a, 15b, 19a to 19d, 23 and 29 to 32 designate components same as or equivalent to those described hereinbefore-by reference to FIGS. 7 to 9.

Referring to FIG. 12, reference numeral 38 designates an inert gas supplying unit which is installed for supplying an inert gas to the gas circulation system including the ozone generator 12.

The control unit for performing a sequential control in the ozone adsorbing/desorbing operation modes is so programmed as to control the inert gas supplying unit 38 in addition to the components mentioned hereinbefore.

Now, referring to FIG. 12, description will be directed to operation of the electric energy conversion/storage system according to the eighth embodiment of the invention. The operation of the electric energy conversion/storage system in the ozone desorbing operation mode is similar to that of the electric energy conversion/storage system according to the fourth embodiment of the invention. Accordingly, repeated description of the ozone desorption operation is omitted.

In the ozone adsorption operation mode, not only an oxygen gas but also an inert gas are supplied to the gas circulation system from the oxygen supplying source 13 and the inert gas supplying unit 38, respectively.

In practical applications, the pressure of the raw gas within the gas circulation system is maintained at a predetermined level constantly (usually at 1.5 to 2.0 $kg/cm^2$).

Besides, concentration of the inert gas is set at a predetermined value. By driving the circulating blower 14 with the change-over valves 19c and 19d being opened, the raw gas containing oxygen and the inert gas is forced to flow through the gas circulation system.

A part of the raw gas is then transformed into ozone molecules under the effect of silent electric discharge when the raw gas flows through an electric discharge gap defined between electrodes (not shown) disposed within the ozone generator 12, whereby an ozonized oxygen gas is produced to be subsequently transported to the adsorption/desorption tower 15. In this conjunction, it is to be noted that owing to the presence of the inert gas contained in the oxygen gas, the electric discharge taking place within the ozone generator 12 is promoted, whereby the amount of ozone gas is increased.

The adsorbent charged in the ozone adsorption/desorption tower 15 adsorbs selectively ozone molecules. The residual part of the oxygen gas containing the inert gas is fed back toward the circulating blower 14 through the change-over valve 19c.

The ozone adsorption/desorption tower 15 is cooled to a temperature not hither than −40° C. by means of the coolant supply source 16. As the preferred material to be used as the adsorbent, there may be mentioned one selected from a group consisting of a porous material impregnated with fluorocarbon, silica gel, activated alumina and a mixture thereof.

The amount of oxygen consumed in the production of ozone is supplemented from the oxygen supplying source 13. By contrast, the inert gas undergoes no consumption. Accordingly, there arises no necessity for supplementing the inert gas.

Figure 13:
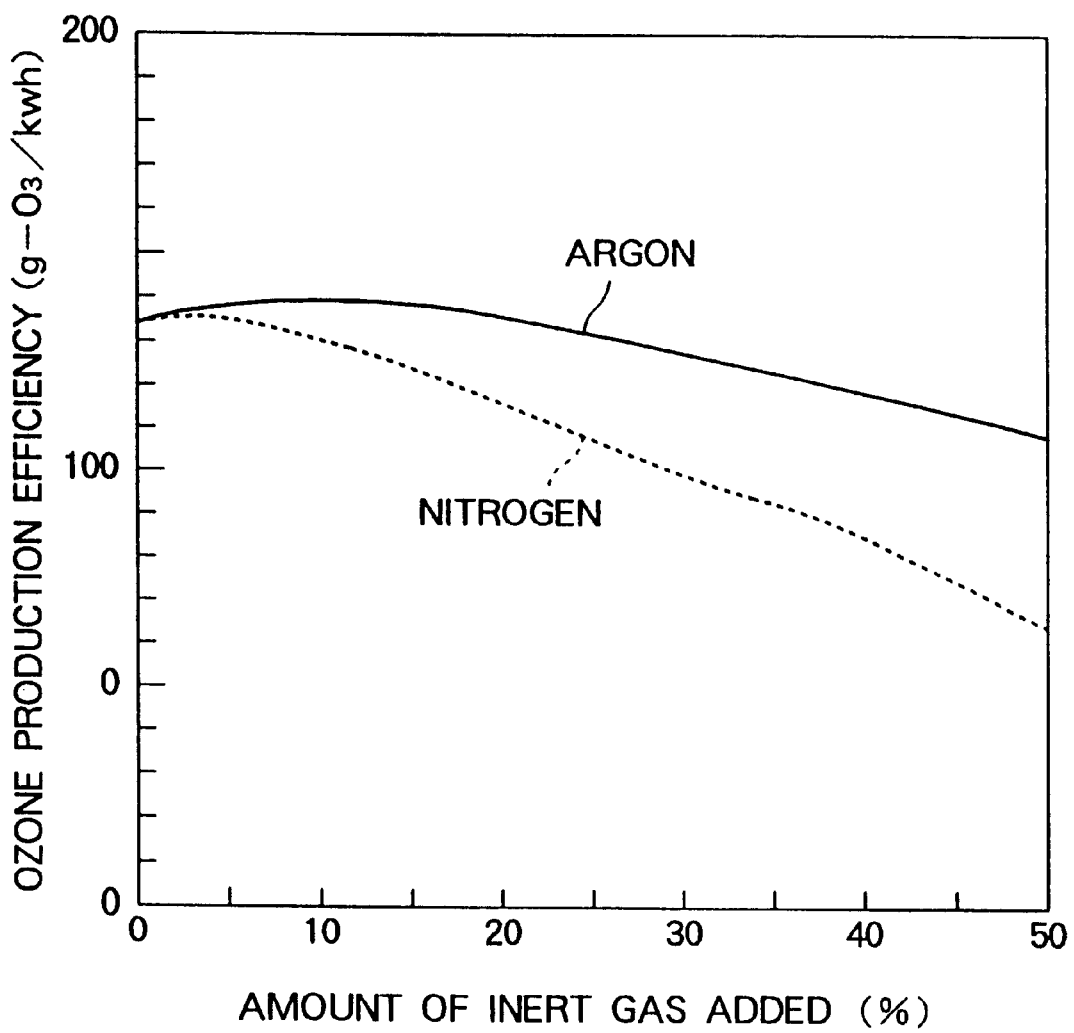
FIG. 13 is a view for graphically illustrating a relation between an amount of an inert gas as added and an ozone production efficiency.

Next, influence of the amount of inert gas as added in the ozone adsorption operation mode will be elucidated by reference to FIG. 13 which is a view for graphically illustrating experimentally obtained results concerning a relation between the amount of inert gas as added and the ozone production efficiency (g-$O_3$/kWh). As the inert gas, a nitrogen gas (broken-line curve) and an argon gas (solid-line curve) are used.

As can be seen from FIG. 13, by adding the nitrogen gas or argon gas in a small amount (several to then percentages), an increase amount of oxygen gas can be generated and the partial pressure of ozone molecules increases correspondingly.

Needless to say, by adding the insert gas to the raw gas to thereby increase the amount of ozone molecules as generated, it is possible to adsorb ozone molecules for storage in the ozone adsorption/desorption tower 15 with an enhanced efficiency.

It is however found that when an excessively large amount of inert gas is added, generation of ozone gas decreases to lower the ozone adsorbing capability of the adsorbent charged in the ozone adsorption/desorption tower 15, as can be seen from FIG. 13. It has been experimentally established that the ozone adsorption can be realized with highest efficiency by setting the concentration of the inert gas added to the gas flowing through the gas circulation system at a level within a range of 3 to 8%.

At this juncture, it should however be mentioned that in case the nitrogen gas as used is the inert gas, nitrogen molecules tend to be decomposed under the effect of the electric discharge for ozonization, as a result of which nitrogen oxide is produced. When nitrogen oxide is brought into contact with the adsorbent such as silica gel charged in the inner cylinder 15a of the ozone adsorption/desorption tower 15, the adsorbent adsorbs nitrogen oxide, which incur degradation of the ozone adsorbing capability of the adsorbent.

For the reason mentioned above, it is preferred to use the argon gas as the inert gas to be additively fed into the gas circulation system.

Embodiment 9

In the electric energy conversion/storage system according to the fourth to eighth embodiments of the invention described above, the control unit (not shown) employed as the ozone concentration control means is so programmed as to execute the sequential control of the opening degree of the ozone gas flow regulating valve 32 incorporated in the ozone concentration regulating means 29 and the nozzle diameter of the gas ejector 30. However, instead of such arrangement, there may be used such a control unit which is so programmed as to respond to detection of the ozone concentration of the ozone containing gas to thereby control straightforwardly the flow rate (ozone concentration) supplied to the ozone consumer 23 (i.e., feedback control of the flow rate of ozone containing gas in dependence on the ozone concentration of the ozone containing gas).

Figure 14:
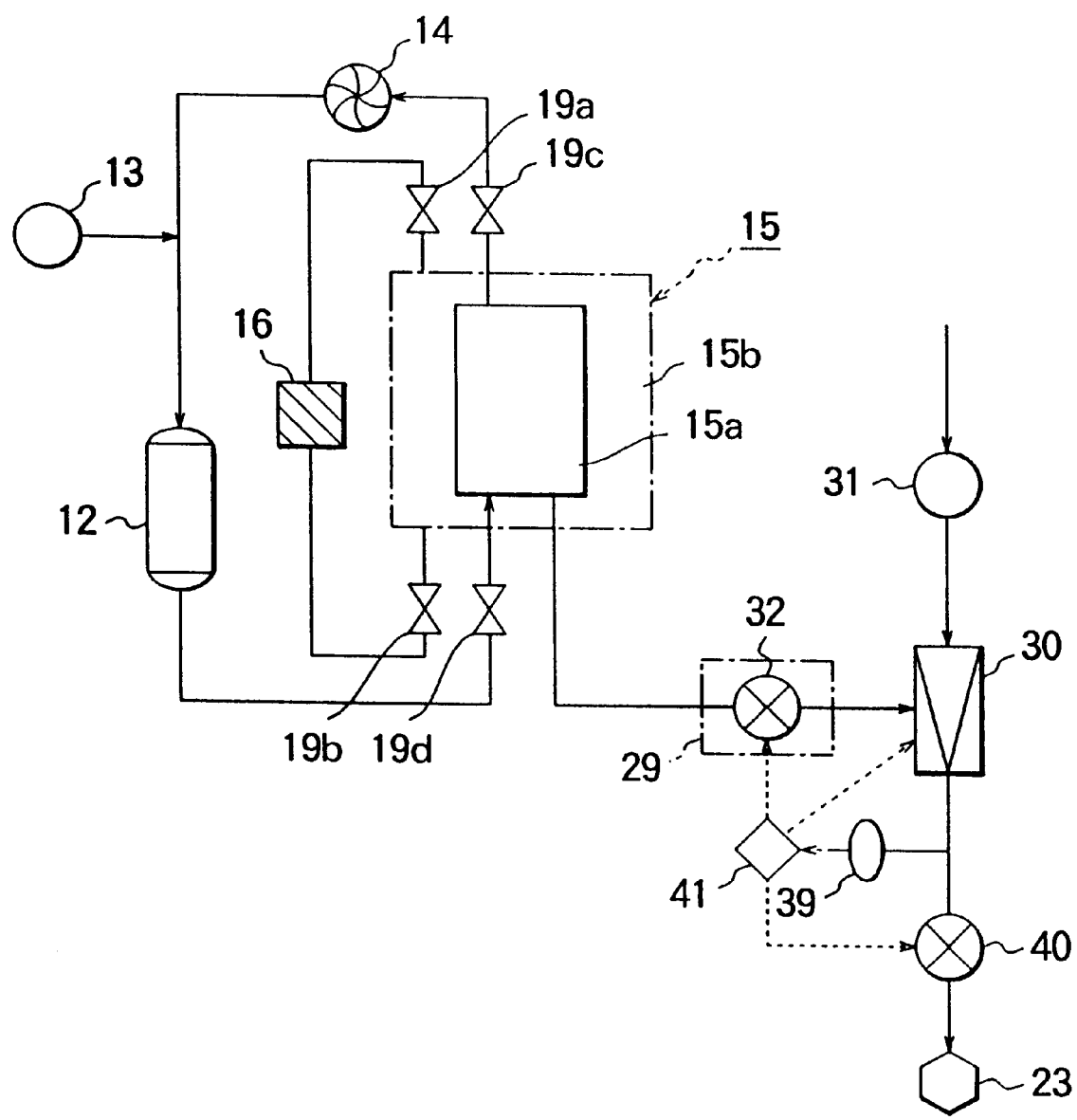
FIG. 14 is a schematic diagram showing generally a structure of an electric energy conversion/storage system according to a ninth embodiment of the present invention.

FIG. 14 is a schematic diagram showing generally a structure of the electric energy conversion/storage system according to a ninth embodiment of the invention in which a feedback control means for controlling the flow rate of the ozone containing gas in dependence on the ozone concentration is provided. In the figure, reference characters 12 to 16, 15a, 15b, 19a to 19d, 23 and 29 to 32 designate components same as or equivalent to those described hereinbefore by reference to FIGS. 7 to 9, 11 and 12.

Referring to FIG. 14, an ozone densimeter 39 is installed in he pipe extending from the outlet of the gas ejector 30 for measuring and detecting the ozone concentration of the ozone containing gas supplied to the ozone consumer 23.

Provided additionally at the exit side of the gas ejector 30 is a supply gas flow regulating valve 40 for regulating to be constant the flow rate of the ozone containing gas fed to the ozone consumer 23.

For controlling the ozone concentration of the ozone containing gas so that the ozone concentration remains at a predetermined value, a control unit 41 is provided which responds to the detection signal (indicating the ozone concentration) outputted from the ozone densimeter 39 to control the gas ejector 30, the ozone gas flow regulating valve 32 and the supply gas flow regulating valve 40 for thereby regulating the flow rate of the ozone containing gas supplied to the ozone consumer 23 such that the ozone concentration and the flow rate of the ozone containing gas continue to remain at predetermined value, respectively.

Parenthetically, the control unit 41 may be implemented as a part of the control unit (now shown) designed for performing the sequential control in the ozone adsorbing/desorbing operation modes. Alternatively, the control unit 41 may be so arranged as to be controlled by the aforementioned control unit.

It will be appreciated that the arrangement shown in FIG. 14 corresponds to that shown in FIG. 7 except that the ozone densimeter 39, the supply gas flow regulating valve 40 and the control unit 41 are additionally provided.

Now, referring to FIG. 14, description will be directed to operation of the electric energy conversion/storage system according to the ninth embodiment of the invention. In this connection, it is to be mentioned that the operation of the electric energy conversion/storage system in the ozone adsorbing operation mode is similar to that of the system according to the fourth embodiment of the invention. Accordingly, repeated description in this respect is omitted.

As described hereinbefore, when the ozone adsorption of the adsorbent charged in the adsorption/desorption tower 15 approaches a saturated adsorption level or state, operation of the electric energy conversion/storage system can be changed over to the ozone desorbing operation mode. Accordingly, operation of the gas circulation system including the ozone generator 12 is stopped. Subsequently, the compressed gas generator 31 is put into operation with a compressed gas being fed to the gas ejector 30 with the ozone gas flow regulating valve 32 being opened gradually.

Thus, the interior of the ozone adsorption/desorption tower 15 is gradually depressurized. In the gas ejector 30, ozone discharged from the ozone adsorption/desorption tower 15 is mixed with the compressed gas by the gas ejector 30 to be supplied to the ozone consumer 23 in the form of an ozone containing gas.

At that time, a detection signal is outputted from the ozone densimeter 39 installed in a pipe through which the ozone containing gas flows. The detection signal is inputted to the control unit 41.

When the ozone concentration indicated by the detection signal is higher than a preset ozone concentration, the control unit 41 outputs control signals to the gas ejector 30 and the ozone gas flow regulating valve 32, respectively, to thereby decrease a little the flow cross-sectional area of the ozone gas flow regulating valve 32 in order to decrease the flow rate of the ozone containing gas while increasing the nozzle diameter of the gas ejector 30.

Consequently, the flow rate of the ozone containing oxygen gas flowing through the ozone gas flow regulating valve 32 is reduced, and the flow rate of the compressed gas flowing through the nozzle of the gas ejector 30 is lowered. As a result, depressurization within the ozone adsorption/desorption tower 15 is mitigated. In other words, the pressure prevailing within the ozone adsorption/desorption tower 15 becomes higher, whereby the amount of the ozone containing oxygen gas discharged from the ozone adsorption/desorption tower 15 is decreased. Thus, the ozone concentration of the ozone containing gas supplied to the ozone consumer 23 is reduced so as to coincide with the predetermined ozone concentration.

On the other hand, when the ozone concentration indicated by the detection signal outputted from the ozone densimeter 39 is lower than the preset ozone concentration, the control unit 41 outputs control signals to the gas ejector 30 and the ozone gas flow regulating valve 32, respectively, to thereby increase a little the flow cross-sectional area of the ozone gas flow regulating valve 32 while decreasing the nozzle diameter of the gas ejector 30.

Consequently, the flow rate of the ozone containing oxygen gas flowing through the ozone gas flow regulating valve 32 is increased, and at the same time the flow rate of the compressed gas flowing through the nozzle of the gas ejector 30 is increased. As a result, the pressure prevailing within the ozone adsorption/desorption tower 15 becomes lower, whereby the amount of the ozone containing oxygen gas discharged from the ozone adsorption/desorption tower 15 increases. Thus, the ozone concentration of the ozone containing gas supplied to the ozone consumer 23 is increased to a level which coincides with the predetermined ozone concentration.

Additionally, the control unit 41 outputs a control signal to the supply gas flow regulating valve 40 upon control of the flow rate of the ozone containing gas flowing into the gas ejector 30, to thereby control the flow rate of the ozone containing gas supplied to the ozone consumer 23 to the predetermined value.

Thus, the ozone containing oxygen gas which contains ozone at a predetermined concentration can be fed to the ozone consumer 23 at a substantially constant rate.

In the foregoing description, it has been assumed that the control unit 41 is so designed as to control not only the opening degree (i.e., flow-pass cross-sectional area) of the ozone gas flow regulating valve 32 but also the nozzle diameter of the gas ejector 30. It should however be mentioned that the control unit 41 may also be so designed as to control at least one of the opening degree of the ozone gas flow regulating valve 32 and the nozzle diameter of the gas ejector 30.

Furthermore, although it has been mentioned that the supply gas flow regulating valve 40 for controlling the flow rate of the ozone containing gas fed to the ozone consumer 23 to be constant is interposed between the gas ejector 30 and the ozone consumer 23, it should be appreciated that the supply gas flow regulating valve 40 may be installed between the compressed gas generator 31 and the gas ejector 30, substantially to the same effect.

Besides, within the spirit and scope of the invention incarnated in the instant embodiment, such arrangements may be resorted to in which the function of the supply gas flow regulating valve 40 is imparted integrally to the compressed gas generator 31 itself to thereby spare the supply gas flow regulating valve 40 or the compressed gas generator 31 is controlled straightforwardly by the control unit 41.

Thus, by providing upstream of the gas ejector 30 the supply gas flow regulating valve 40 operated to cancel out the operation of the ozone gas flow regulating valve 32, the flow rate control performance of the electric energy conversion/storage system can further be enhanced because of easiness of setting the depressurization of the ozone adsorption/desorption tower 15 for taking out the ozone containing gas therefrom.

Embodiment 10

In the electric energy conversion/storage system according to the ninth embodiment of the invention described above, the nozzle diameter (i.e., flow-path cross-sectional area) of the gas ejector 30 is controlled in order to regulate the depressurization within the ozone adsorption/desorption tower 15 for the purpose of controlling the ozone concentration (flow rate) of the ozone containing gas. However, for achieving substantially same effect, a bypass pipe may be provided in parallel with the gas ejector 30 for controlling the ratio between the gas flow in the gas ejector 30 and the bypass pipe by employing a two-way flow rate regulating valve, as in the case of the electric energy conversion/storage system according to the fifth embodiment of the invention shown in FIG. 8.

Figure 15:
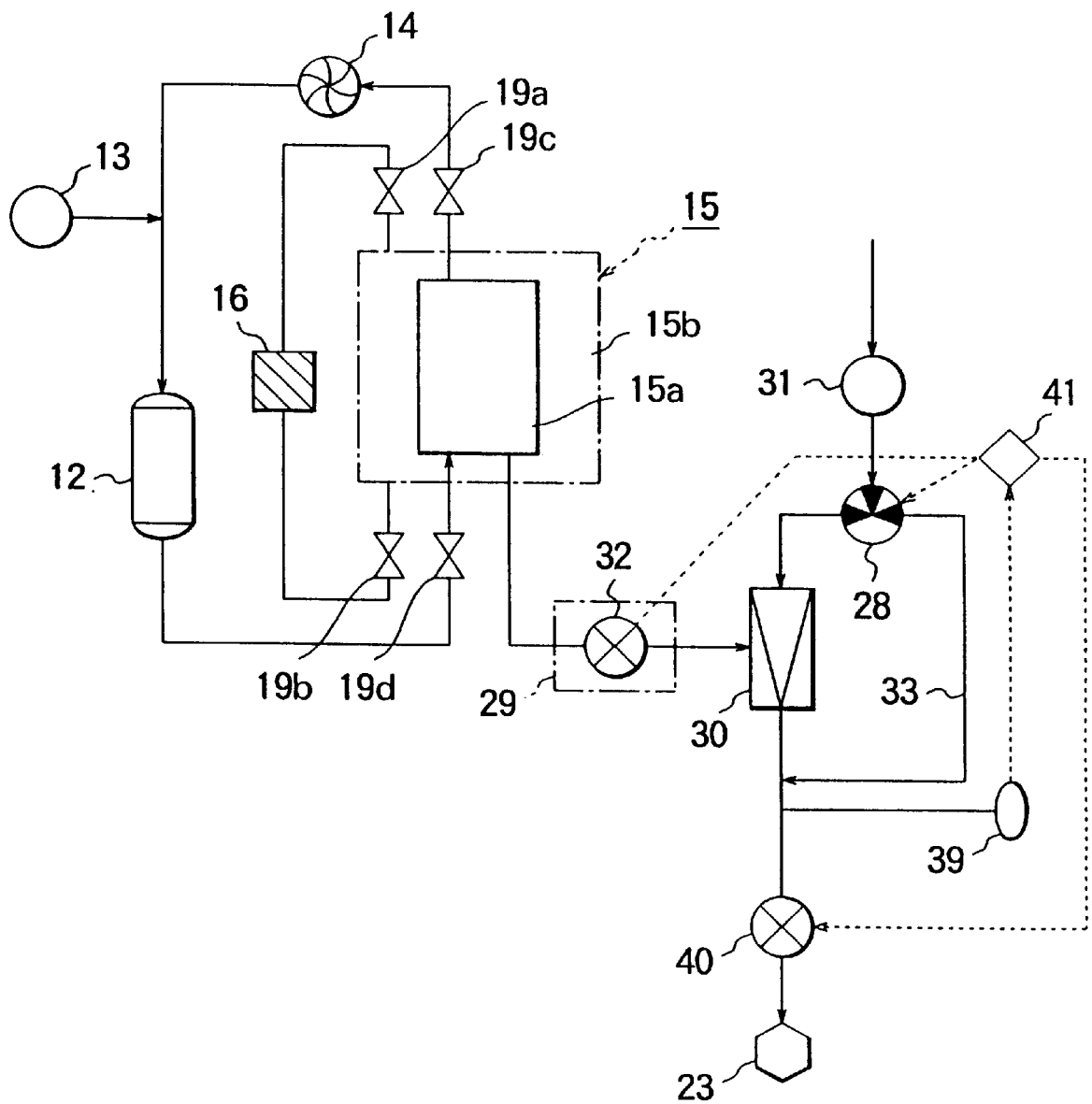
FIG. 15 is a schematic diagram showing generally a structure of an electric energy conversion/storage system according to a tenth embodiment of the present invention.

FIG. 15 is a schematic diagram showing generally a structure of the electric energy conversion/storage system according to a tenth embodiment of the invention in which a bypass pipe is provided in parallel with the gas ejector 30 for regulating the ozone concentration. In the figure, reference characters 12 to 16, 15a, 15b, 19a to 19d, 23, 28 to 33 and 39 to 41 designate components same as or equivalent to those described hereinbefore by reference to FIGS. 8 and 14. Accordingly, repetitive description of these components will be unnecessary.

According to a teachings of the invention incarnated in the instant embodiment, the control unit 41 which operates in response to the detection signal outputted from the ozone densimeter 39 is adapted to control the two-way flow regulating valve 28 which is designed to regulate the ratio of the compressed gas flows in the gas ejector 30 and the bypass pipe 33 for thereby controlling depressurization of the ozone adsorption/desorption tower 15 (i.e., negative pressure or vacuum prevailing at the exit side of the ozone adsorption/desorption tower 15).

By enabling the feedback control of the supply gas flow regulating valve 40 together with the opening degrees of the ozone gas flow regulating valve 32 and the two-way flow regulating valve 28, respectively, in dependence on the detection signal outputted from the ozone densimeter 39, there can be ensured substantially same ozone desorption effect as those of the electric energy conversion/storage systems described hereinbefore.

More specifically, in the ozone desorption operation mode, the gas ejector 30 and the compressed gas generator 31 are put into operation with the ozone gas flow regulating valve 32 being opened gradually, whereby the ozone containing gas is fed to the ozone consumer 23. At that time, the ozone concentration of the ozone containing gas is measured by the ozone densimeter 39, the detection signal of which is inputted to the control unit 41.

When the ozone concentration indicated by the detection signal outputted from the ozone densimeter 39 is higher than a preset ozone concentration, the control unit 41 outputs a control signal to the ozone gas flow regulating valve 32 for closing it a little and at the same time controls the two-way flow regulating valve 28 so that the flow rate of the gas flowing through the bypass pipe 33 is increased. As a result of this, the flow rate of the compressed gas supplied to the gas ejector 30 is reduced correspondingly.

Consequently, the flow rate of the compressed gas flowing through the nozzle of the gas ejector 30 is lowered. As a result, depressurization within the ozone adsorption/desorption tower 15 is mitigated. In other words, the pressure prevailing within the ozone adsorption/desorption tower 15 becomes higher, whereby the amount of the ozone containing oxygen gas discharged from the ozone adsorption/desorption tower 15 is decreased. Thus, the ozone concentration of the ozone containing gas supplied to the ozone consumer 23 is reduced.

On the contrary, when the ozone concentration indicated by the detection signal outputted from the ozone densimeter 39 is lower than the preset ozone concentration, the control unit 41 outputs a control signal to the ozone gas flow regulating valve 32 for opening it a little and at the same time controls the two-way flow regulating valve 28 so that the flow rate of the gas flowing through the bypass pipe 33 is decreased. As a result of this, the flow rate of the compressed gas supplied to the gas ejector 30 increases correspondingly.

Consequently, the flow rate of the compressed gas flowing through the nozzle of the gas ejector 30 is increased. As a result, depressurization within the ozone adsorption/desorption tower 15 is intensified. In other words, the pressure prevailing within the ozone adsorption/desorption tower 15 becomes lower, whereby the amount of the ozonized oxygen discharged from the ozone adsorption/desorption tower 15 is increased. Thus, the ozone concentration of the ozone containing gas supplied to the ozone consumer 23 is increased.

Additionally, the control unit 41 outputs a control signal to the supply gas flow regulating valve 40 simultaneously with the control of the flow rate of the ozone containing gas flowing into the gas ejector 30, to thereby control the flow rate of the ozone containing gas supplied to the ozone consumer 23 to a predetermined value.

In this case, the supply gas flow regulating valve 40 may be disposed at the upstream side of the two-way flow regulating valve 28. Furthermore, such arrangement may be adopted in which the compressed gas generator 31 itself serves also for the function of the supply gas flow regulating valve 40.

Embodiment 11

In the electric energy conversion/storage systems according to the fourth to tenth embodiments of the invention described above, the compressed gas for driving the gas ejector 30 is derived directly from the compressed gas generator 31. However, in order to further reduce the electric power consumption for extracting the ozone gas, the compressed gas may be stored previously in a reservoir and discharged at the time point when the compressed gas supply is required.

Figure 16:
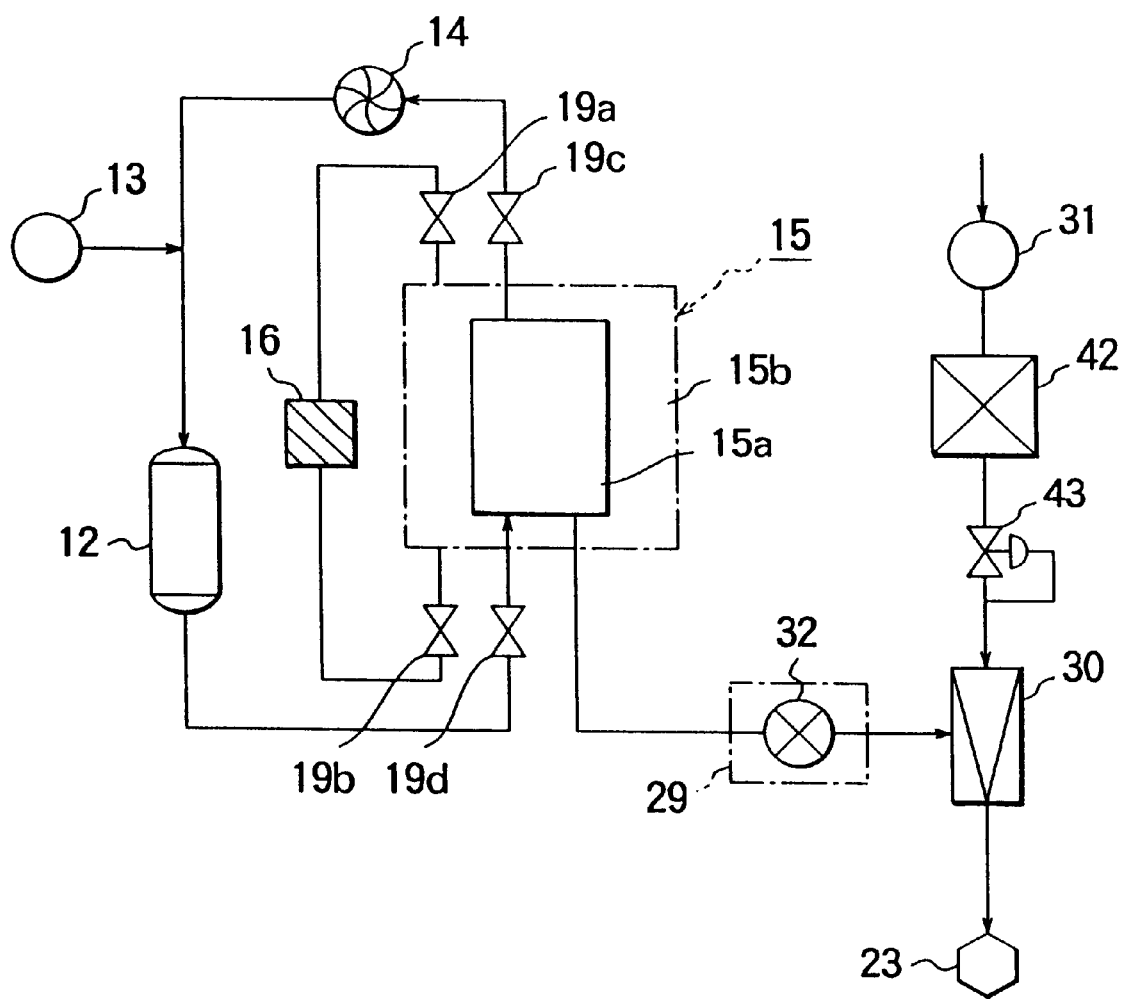
FIG. 16 is a schematic diagram showing generally a structure of an electric energy conversion/storage system according to an eleventh embodiment of the present invention.

FIG. 16 is a schematic diagram showing generally a structure of the electric energy conversion/storage system according to an eleventh embodiment of the invention in which the compressed gas is stored previously. In the figure, reference characters 12 to 16, 15a, 15b, 19a to 19d, 23 and 29 to 32 designate components same as or equivalent to those described hereinbefore by reference to FIG. 7. Accordingly, repetitive description of these components is omitted.

As can be seen in the figure, a compressed gas storing tank 42 is provided for storing a compressed gas produced by the compressed gas generator 31 together with a compressed gas pressure regulating valve 43 for regulating or adjusting the pressure of the compressed gas when it is fed out from the compressed gas storing tank 42.

Now, referring to FIG. 16, description will be made of the operation of the electric energy conversion/storage system according to the eleventh embodiment. In this connection, it is to be mentioned that the operation of the electric energy conversion/storage system in the ozone adsorbing operation mode is same as in the case of the systems described hereinbefore. However, during a period for producing and storing ozone, the compressed gas generator 31 is operated, whereby the compressed gas is stored in the compressed gas storing tank 42.

In the ozone desorption operation mode, the gas circulation system including the ozone generator 12 is stopped, while the compressed gas pressure regulating valve 43 is opened. Thus, the compressed gas is supplied to the gas ejector 30 with the ozone gas flow regulating valve 32 being opened progressively.

Consequently, ozone is sucked from the ozone adsorption/desorption tower 15 under the effect of depressurization, whereby an ozone containing gas resulting from mixing operation of the gas ejector 30 is supplied to the ozone consumer 23.

In this case, the compressed gas generator 31 may be driven only upon depletion of the compressed gas contained in the compressed gas storing tank 42 for supplementing the compressed gas. Thus, the electric power demanded for operating the compressed gas generator 31 for ozone feeding can be reduced. In other words, it can be said that the compressed gas storing tank 42 stores the electric energy required for extraction of ozone from the ozone adsorption/desorption tower 15, contributing to realization of enhanced electric energy storage effect.

Embodiment 12

In the electric energy conversion/storage system according to the eleventh embodiment of the invention, the compressed gas generator 31 is driven during the ozone producing/storing period to store the compressed gas in the compressed gas storing tank 42. However, a liquidized gas may be produced by using an air liquidizing and stored in a reservoir, wherein in the ozone desorption operation mode, the liquidized air heated for transformation into a compressed gas.

Figure 17:
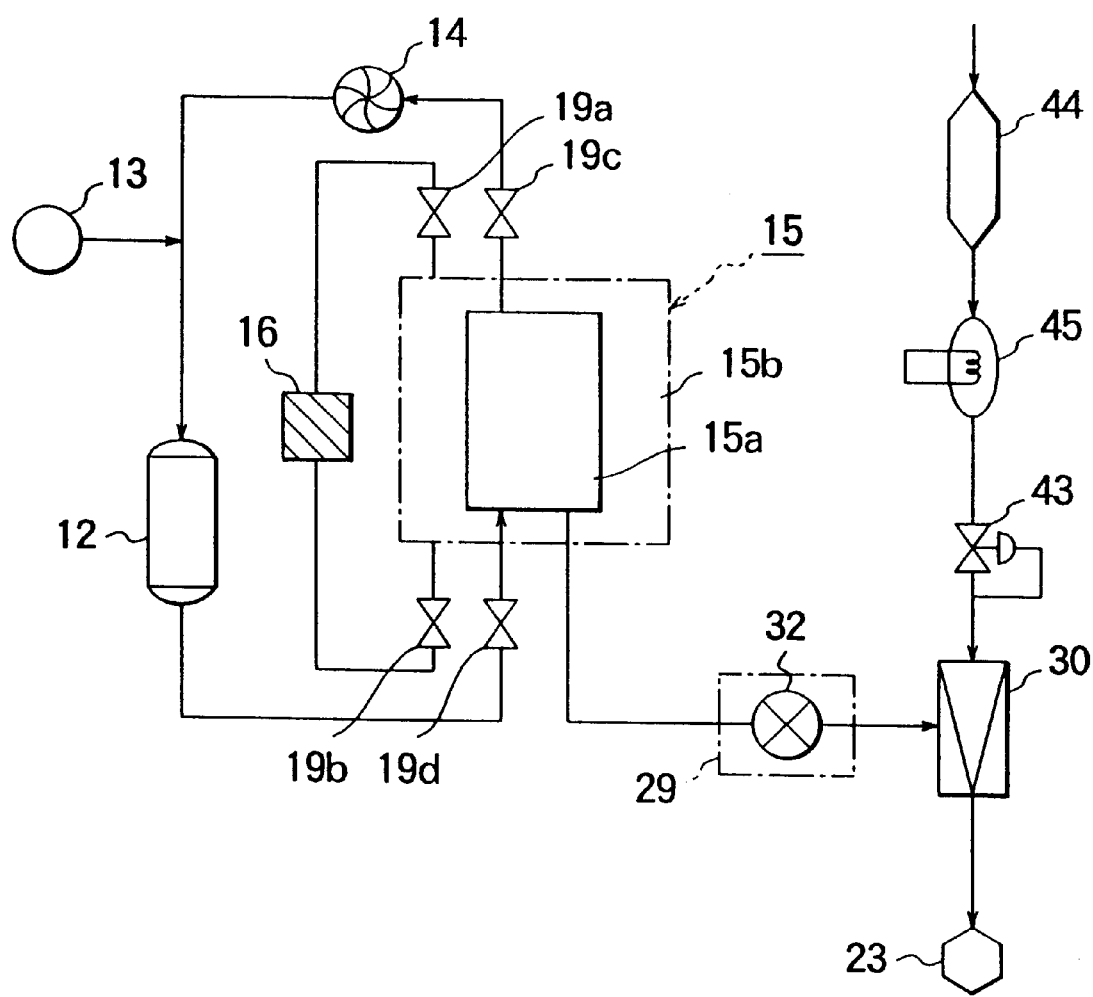
FIG. 17 is a schematic diagram showing generally a structure of an electric energy conversion/storage system according to a twelfth embodiment of the present invention.
Figure 18:
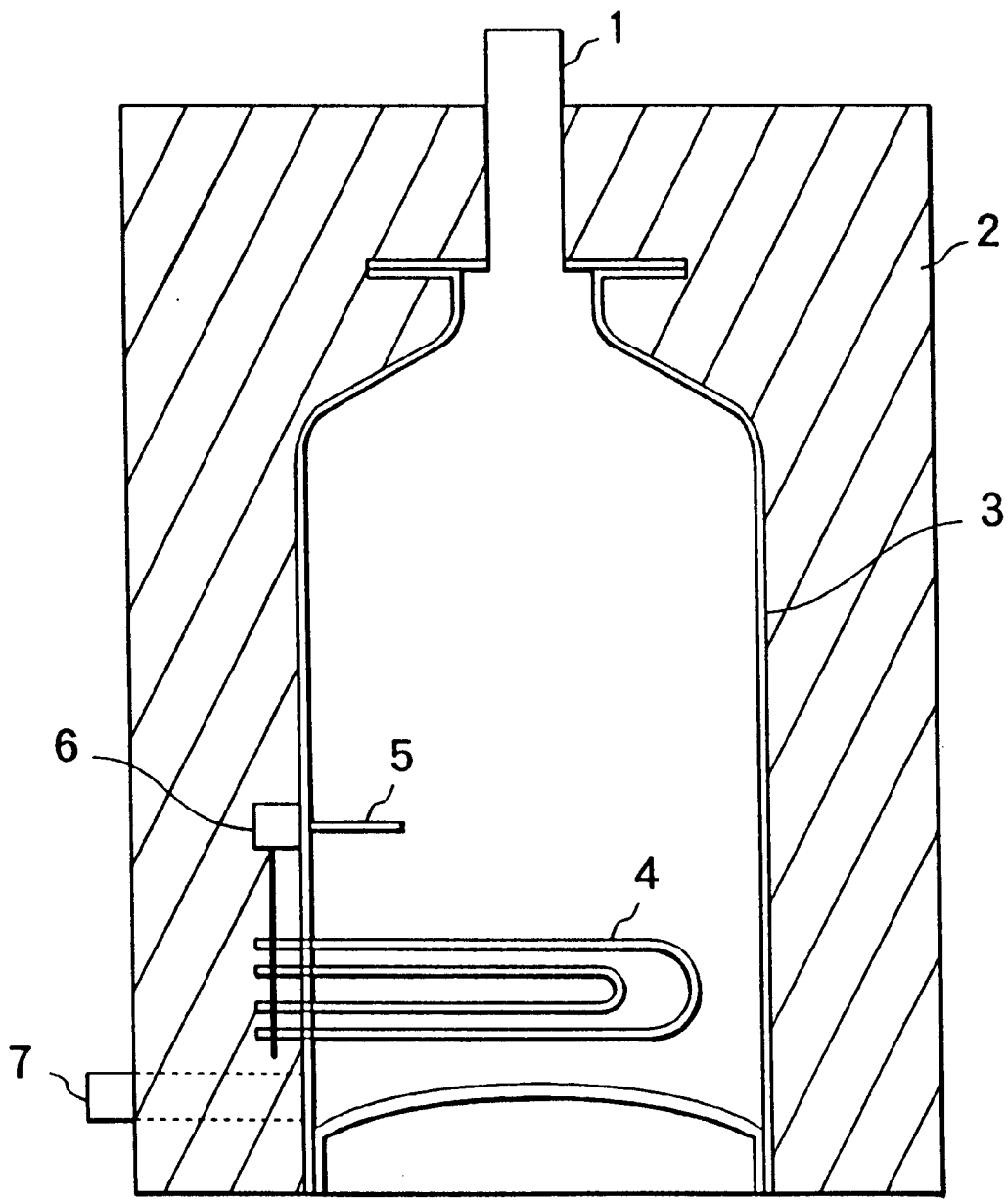
FIG. 18 is a side elevational view showing in section a structure of an electric water heater as a conventional electric energy conversion/storage system.
Figure 19:
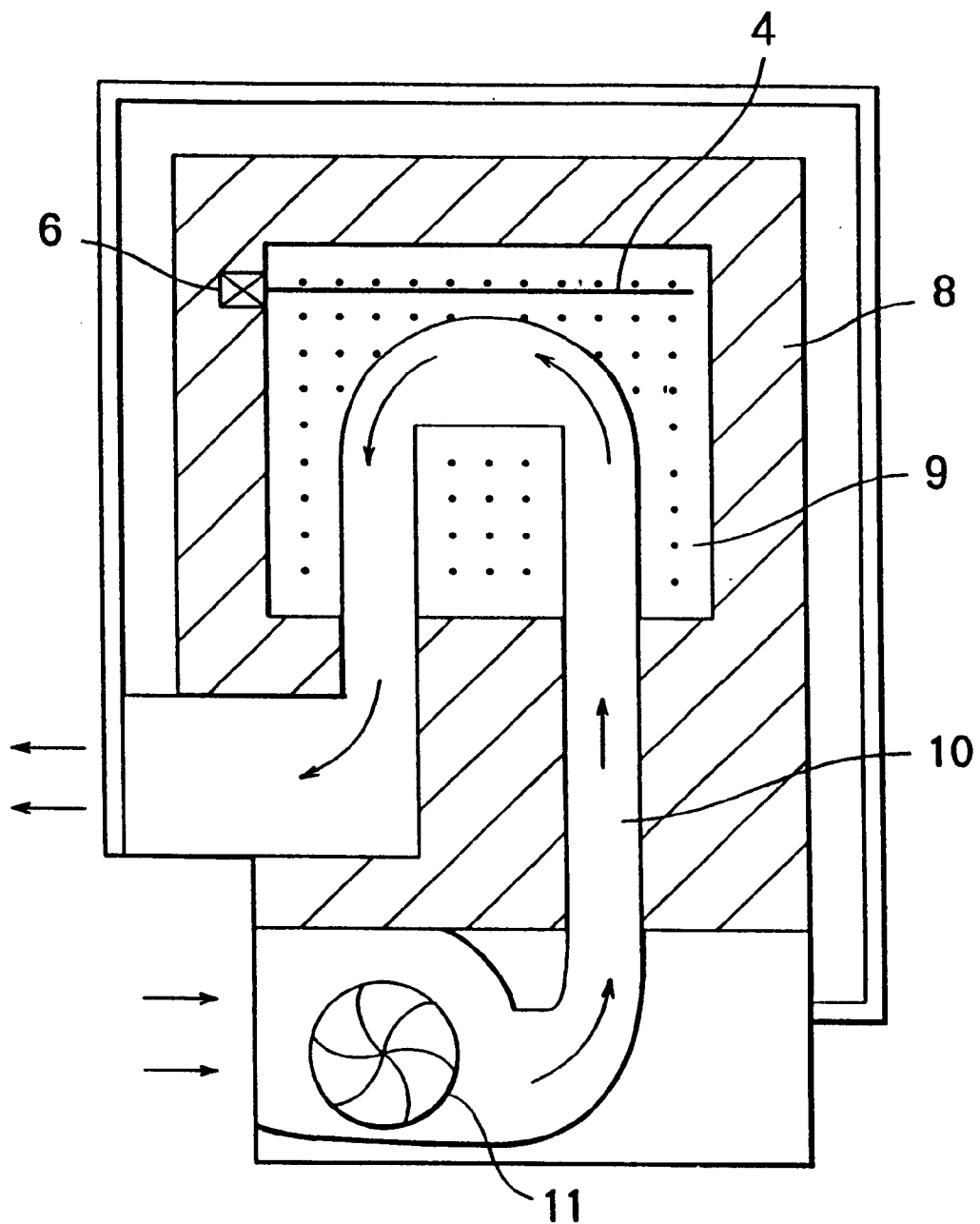
FIG. 19 is a side elevational view showing in section a heat-accumulation type hot-air generator as another one of conventional electric energy conversion/storage systems.

FIG. 17 is a schematic diagram showing generally a structure of the electric energy conversion/storage system according to a twelfth embodiment of the invention in which an air liquidizing unit is employed for storing the compressed gas previously. In the figure, reference characters 12 to 16, 15a, 15b, 19a to 19d, 23, 29, 32 and 43 designate components same as or equivalent to those described hereinbefore by reference to FIG. 16.

As can be seen in FIG. 17, a air liquidizing unit 44 is provided which is driven during the ozone producing/storing period for liquidizing air and storing the liquidized air, wherein the compressed gas generator 31 may be disposed at the inlet side of the air liquidizing unit 44. Further provided is a electric heater 45 for transforming the liquidized air stored in the air liquidizing unit 44 into a compressed gas. The electric heater 45 is electrically energized in the ozone desorption operation mode for gasifying the liquidized air for generating the compressed gas, which is then supplied to the gas ejector 30 by way of the compressed gas pressure regulating valve 43.

In the electric energy conversion/storage system now under consideration, the electric heater 45 has to be operated for gasifying the liquidized air, which involves consumption of a corresponding amount of electric energy. Thus, when composed with the electric energy conversion/storage system according to the eleventh embodiment described above, the electric energy storage efficiency will be degraded to some extent. Except for this, other advantageous effects mentioned previously can essentially be censured.

In the electric energy conversion/storage system according to the twelfth embodiment of the invention, the air liquidizing unit 44 and the electric heater 45 are installed independent of the ozone adsorption/desorption tower 15. It goes however without saying that they may be provided in association with the ozone adsorption/desorption tower 15. In that case, the cooling action of the liquidized air contained in the air liquidizing unit 44 may be made use of for cooling the ozone adsorption/desorption tower 15, which means that the electric power consumption involved in driving the coolant supply source 16 in the ozone adsorption operation mode can be saved.

Furthermore, by gasifying the liquidized air produced by the air liquidizing unit 44 by utilizing heat generated by the ozone adsorption/desorption tower 15, it is possible to reduce the electric power for driving the electric heater 45 in the ozone desorption operation mode can be saved. In other words, an electric energy conversion/storage system of low energy type can be realized. In that case, the ozone adsorption/desorption tower 15 will be cooled due to gasification of the liquidized air in the ozone desorption operation mode, which provides, however, substantially no problem.

Many modifications and variations of the present invention are possible in the light of the above techniques. It is therefore to be understood that within the scope of the appended claims, the invention may be practiced otherwise than as specifically described.

What is claimed is:

1. An electric energy conversion/storage system, comprising:
    ozone generating means for producing an ozonized gas from a raw material gas containing oxygen by utilizing electric energy;
    ozone adsorbing/desorbing means for adsorbing ozone contained in said ozonized gas and desorbing ozone adsorbed;
    a gas circulation system for causing said raw material gas and said ozonized gas to flow by way of said ozone generating means and said ozone adsorbing/desorbing means while feeding back to said ozone generating means a residual oxygen gas remaining after adsorption of ozone from said ozonized gas;
    coolant supply means for cooling said ozone adsorbing/desorbing means; and
    ozone discharging means for taking out an ozone containing gas which contains ozone from said ozone adsorbing/desorbing means to thereby supply said ozone containing gas to an ozone consumer;
    wherein said ozone discharging means includes ozone concentration control means for enabling supply of said ozone containing gas to said ozone consumer substantially at a predetermined constant ozone concentration and substantially at a predetermined flow rate.

2. An electric energy conversion/storage system according to claim 1, further comprising:
    pressure sustaining means for sustaining a pressure within said ozone adsorbing/desorbing means to be higher than the atmospheric pressure.

3. An electric energy conversion/storage system according to claim 2,
    wherein said pressure sustaining means includes:
        pressurizing pump means disposed at an entrance side of said ozone adsorbing/desorbing means;
        flow regulating means for adjusting a flow rate of the ozonized gas supplied to said pressurizing pump means to be substantially constant; and
        back-pressure valve means disposed at an exit side of said ozone adsorbing/desorbing means for restoring pressure of the raw material gas supplied to said ozone generating means to the atmospheric pressure.

4. An electric energy conversion/storage system according to claim 1, further comprising:
    inert gas supply means for supplying an inert gas to said gas circulation system.

5. An electric energy conversion/storage system according to claim 4,
    wherein said inert gas is an argon gas.

6. An electric energy conversion/storage system according to claim 1,
    wherein said ozone concentration control means includes:
        an ozone densimeter for measuring an ozone concentration of said ozone containing gas;
        a first flow regulating valve for regulating a flow rate of the ozone containing gas taken out from said ozone adsorbing/desorbing means;
        a second flow regulating valve for regulating a flow rate of the ozone containing gas supplied to said ozone consumer; and
        control means for controlling said first and second flow regulating valves on the basis of said ozone concentration,
        wherein said control means controls said first and second flow regulating valves so that flow-path cross-sectional area of said first flow regulating valve is decreased while that of said second flow regulating valve is increased when said ozone concentration is higher than a predetermined ozone concentration, and
        wherein said control means controls said first and second flow regulating valves so that the flow-path cross-sectional area of said first flow regulating valve is increased while that of said second flow regulating valve is decreased when said ozone concentration is lower than said predetermined ozone concentration.

7. An electric energy conversion/storage system according to claim 1, wherein said ozone concentration control means includes:
- an ozone densimeter for measuring an ozone concentration of said ozone containing gas;
- a depressurization regulating means for regulating depressurization required for taking out ozone from said ozone adsorbing/desorbing means;
- a flow regulating valve for regulating a flow rate of the ozone containing gas supplied to said ozone consumer; and
- control means for controlling said depressurization regulating means and said flow regulating valve on the basis of said ozone concentration,
- wherein said control means controls said depressurization regulating means and said flow regulating valve so that said depressurization is lowered while flow-path cross-sectional area of said flow regulating valve is increased when said ozone concentration is higher than a predetermined ozone concentration, and
- wherein said control means controls said depressurization regulating means and said flow regulating valve so that said depressurization is intensified while the flow-path cross-sectional area of said flow regulating valve is decreased when said ozone concentration is lower than said predetermined ozone concentration.

8. An electric energy conversion/storage system according to claim 7,
wherein said depressurization regulating means includes a gas ejector for extracting ozone from said ozone adsorbing/desorbing means by lowering the pressure within said ozone adsorbing/desorbing means;
said gas ejector including a nozzle through which a compressed gas is caused to flow;
said control means controlling said depressurization by adjusting a diameter of said nozzle.

9. An electric energy conversion/storage system according to claim 7,
wherein said depressurization regulating means includes:
- a gas ejector for extracting ozone from said ozone adsorbing/desorbing means by lowering the pressure within said ozone adsorbing/desorbing means;
- a bypass pipe disposed in parallel with said gas ejector; and
- a two-way flow regulating valve for regulating a flow ratio of compressed gas flow between said gas ejector and said bypass pipe,
- wherein said control means controls the depressurization within said ozone adsorbing/desorbing means by regulating said compressed gas flow ratio by controlling said two-way flow regulating valve.

10. An electric energy conversion/storage system according to claim 8, further comprising:
gas storing means for storing a compressed gas to be used for driving said gas ejector.

11. An electric energy conversion/storage system according to claim 10,
wherein said gas storing means is comprised of a compressed gas storing tank.

12. An electric energy conversion/storage system according to claim 10,
wherein said gas storing means is comprised of air liquidizing means for storing air in a liquidized state.

13. An electric energy conversion/storage system according to claim 12,
wherein said air liquidizing means is disposed in association with said ozone adsorbing/desorbing means so that said air liquidizing means serves additionally as a coolant supply source for said ozone adsorbing/desorbing means.

* * * * *